United States Patent
Chitrakar et al.

(10) Patent No.: US 11,177,908 B2
(45) Date of Patent: Nov. 16, 2021

(54) COMMUNICATION METHOD AND COMMUNICATION APPARATUS FOR BLOCK ACKNOWLEDGMENT TRANSMISSION

(71) Applicant: Panasonic Intellectual Property Management Co., Ltd., Osaka (JP)

(72) Inventors: Rojan Chitrakar, Singapore (SG); Lei Huang, Singapore (SG)

(73) Assignee: Panasonic Intellectual Property Management Co., Ltd, Osaka (JP)

( * ) Notice: Subject to any disclaimer, the term of this patent is extended or adjusted under 35 U.S.C. 154(b) by 0 days.

(21) Appl. No.: 16/073,293

(22) PCT Filed: Jan. 31, 2017

(86) PCT No.: PCT/JP2017/003283
§ 371 (c)(1),
(2) Date: Jul. 26, 2018

(87) PCT Pub. No.: WO2017/150042
PCT Pub. Date: Sep. 8, 2017

(65) Prior Publication Data
US 2019/0036651 A1    Jan. 31, 2019

Related U.S. Application Data

(60) Provisional application No. 62/303,178, filed on Mar. 3, 2016.

(30) Foreign Application Priority Data

Oct. 28, 2016 (JP) .................................. 2016-211813

(51) Int. Cl.
*H04L 1/16*  (2006.01)
*H04L 1/18*  (2006.01)

(52) U.S. Cl.
CPC .............. *H04L 1/1621* (2013.01); *H04L 1/16* (2013.01); *H04L 1/1614* (2013.01);
(Continued)

(58) Field of Classification Search
CPC combination set(s) only.
See application file for complete search history.

(56) References Cited

U.S. PATENT DOCUMENTS

2006/0034317 A1* 2/2006 Hong .................... H04L 1/1614
370/445
2006/0104300 A1* 5/2006 Ho ........................ H04L 1/0083
370/428

(Continued)

FOREIGN PATENT DOCUMENTS

WO    2006/016745 A1    2/2006

OTHER PUBLICATIONS

IEEE Standards Association, "Part 11 : Wireless LAN Medium Access Control (MAC) and Physical Layer (PHY) Specifications," IEEE Std 802.11™, *IEEE Standard for Information Technology—Telecommunications and information exchange between systems : Local and metropolitan area networks—Specific requirements*, Mar. 29, 2012, 2793 pages.

(Continued)

*Primary Examiner* — Lakeram Jangbahadur
(74) *Attorney, Agent, or Firm* — Seed IP Law Group LLP

(57) ABSTRACT

A communication method for transmitting a block acknowledgment (BlockAck) frame is presented. The communication method includes receiving a plurality of frames from a transmitting device, wherein the payload of a frame may consist of either fragmented or unfragmented packet, recording the receive status of the frames, generating a BlockAck frame that contains at least one Bitmap field used to indicate the receive status of the frames, the number of bits allocated (Continued)

in the Bitmap field for a packet being variable and transmitting the BlockAck frame.

12 Claims, 35 Drawing Sheets

(52) U.S. Cl.
CPC .......... *H04L 1/1642* (2013.01); *H04L 1/1685* (2013.01); *H04L 1/1832* (2013.01)

(56) References Cited

U.S. PATENT DOCUMENTS

| | | | |
|---|---|---|---|
| 2010/0118986 A1* | 5/2010 | Hong | H04L 1/1614 375/259 |
| 2012/0014335 A1* | 1/2012 | Adachi | H04W 72/0446 370/329 |
| 2013/0294360 A1* | 11/2013 | Yang | H04L 1/1614 370/329 |
| 2014/0351446 A1* | 11/2014 | Cho | H04L 67/141 709/227 |

OTHER PUBLICATIONS

International Search Report of PCT application No. PCT/JP2017/003283 dated Apr. 11, 2017.

IEEE 802.11-15/0132r14, "Specification Framework for TGax", Jan. 21, 2016.

IEEE Std 802.11 (TM)—2012, "IEEE Standard for Information technology—Telecommunications and information exchange between systems Local and metropolitan area networks—Specific requirements, Part11: Wireless LAN Medium Access Control (MAC) and Physical Layer (PHY) Specifications", IEEE Computer Society, Mar. 29, 2012.

IEEE 802.11-16/0050r1, "Fragmentation for MU frames—Follow up on acks", Jan. 19, 2016.

* cited by examiner

[Fig. 1]
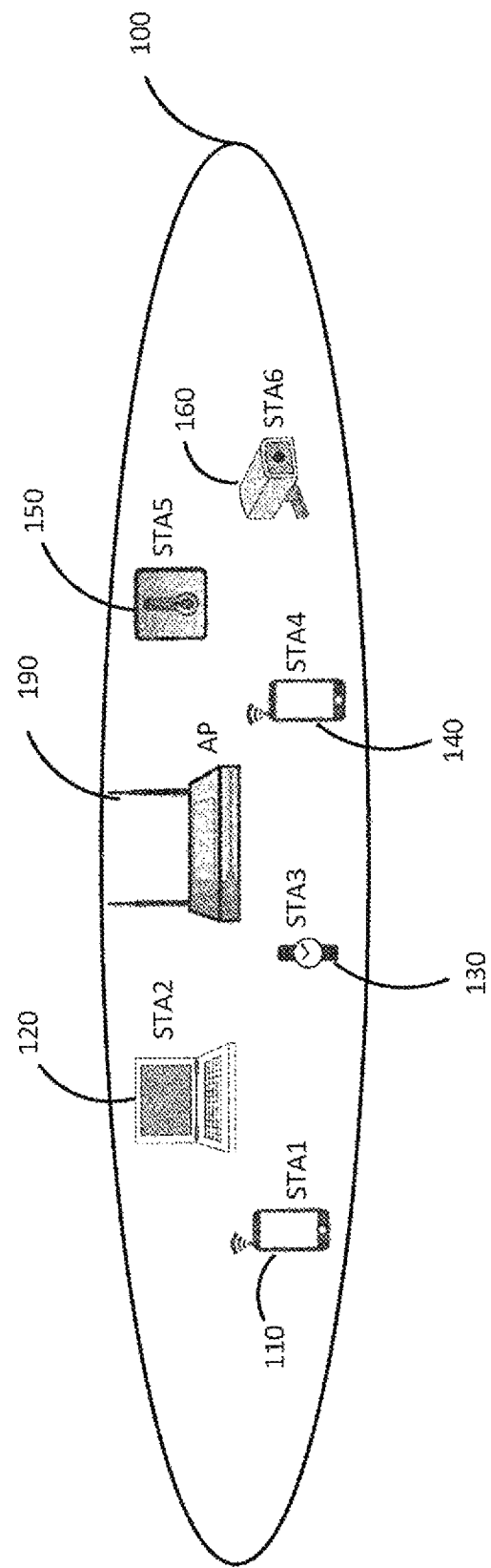

[Fig. 2]
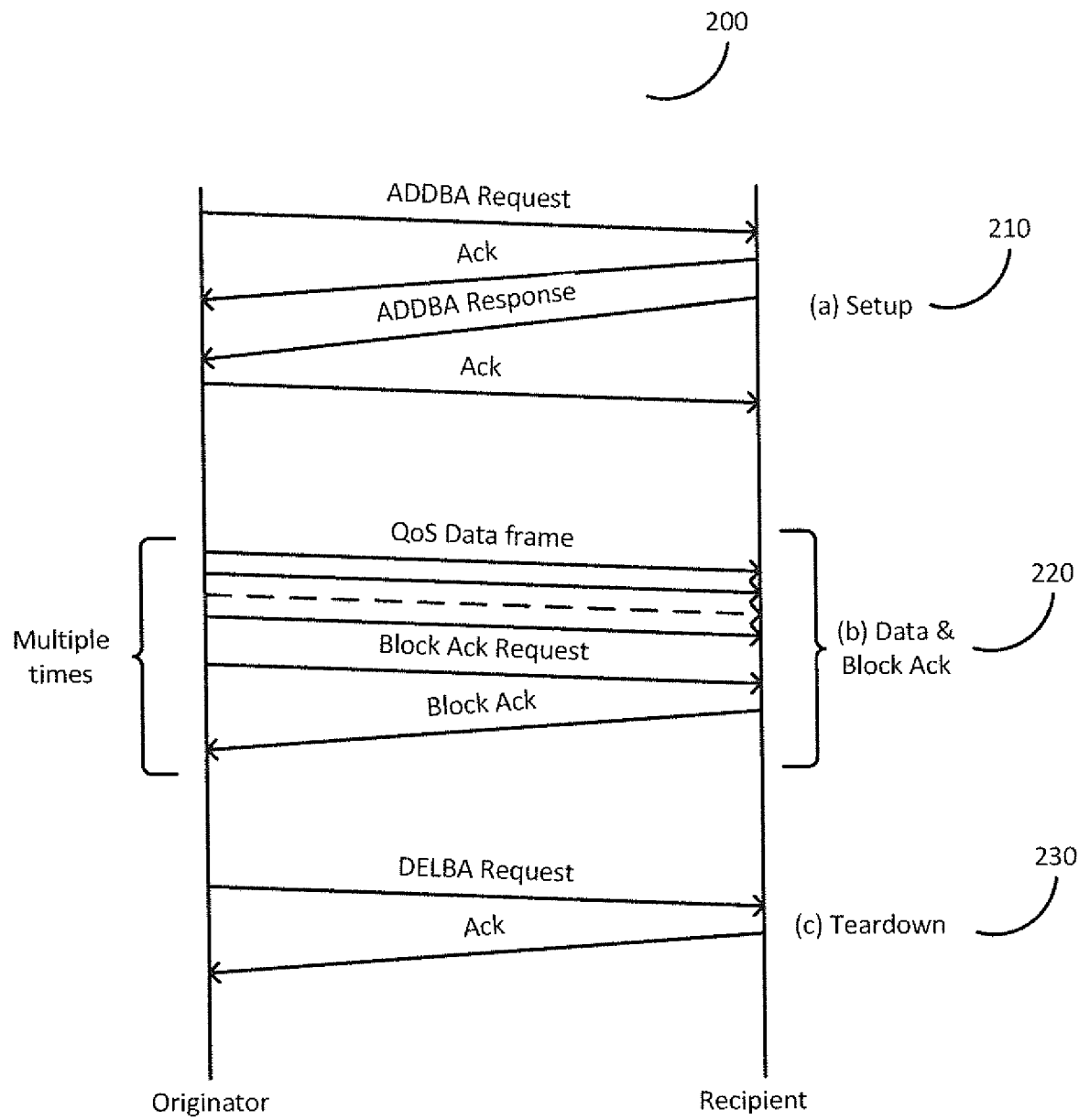

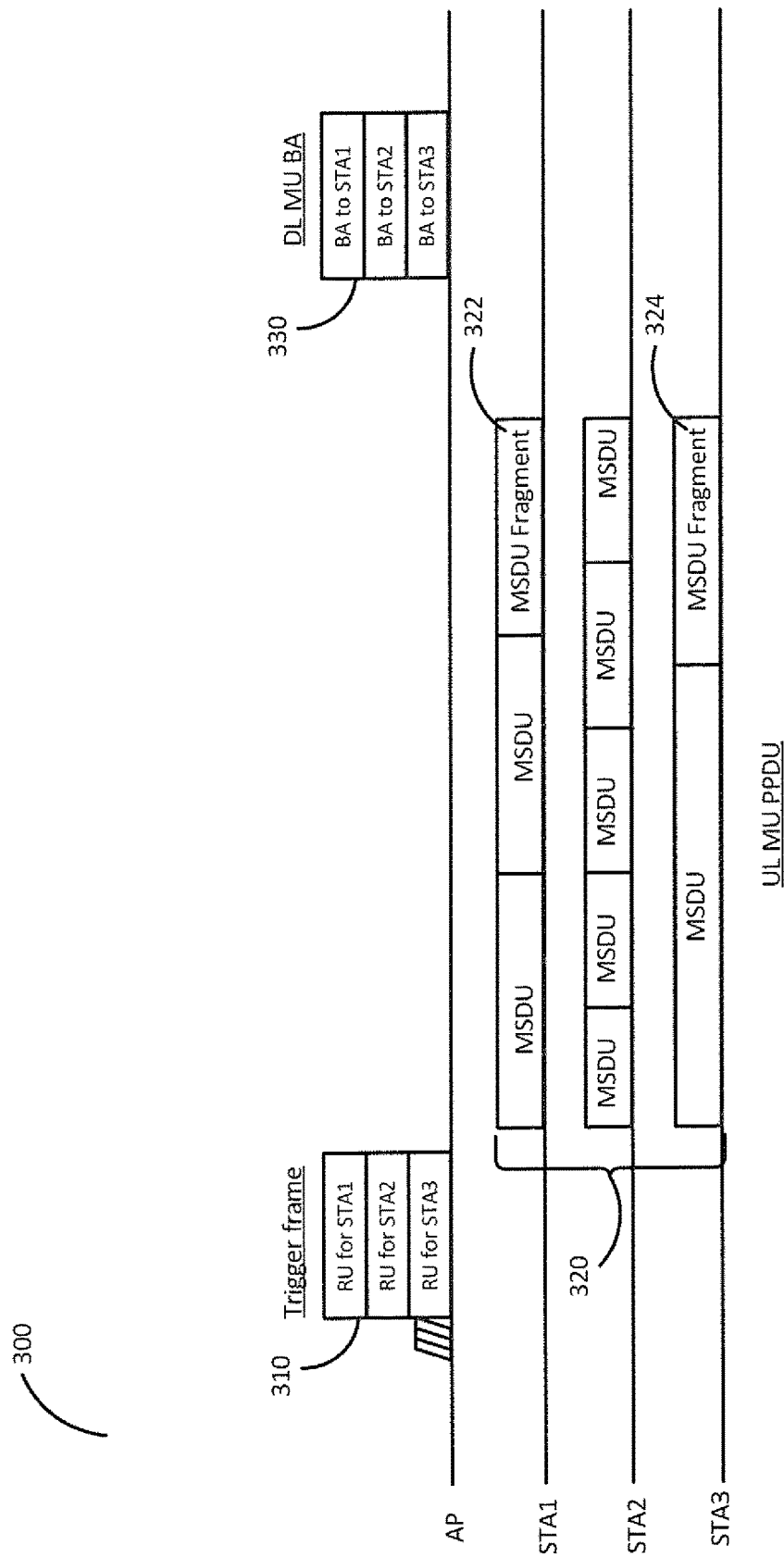
[Fig. 3]

[Fig. 4]
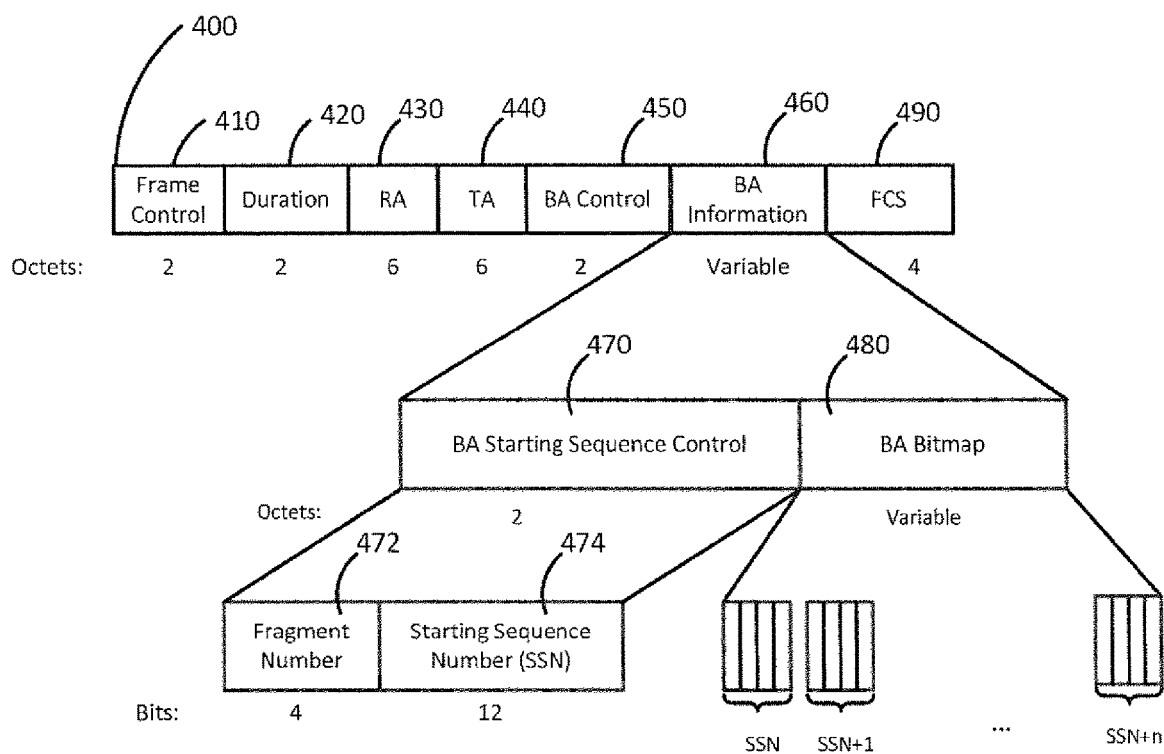

[Fig. 5]
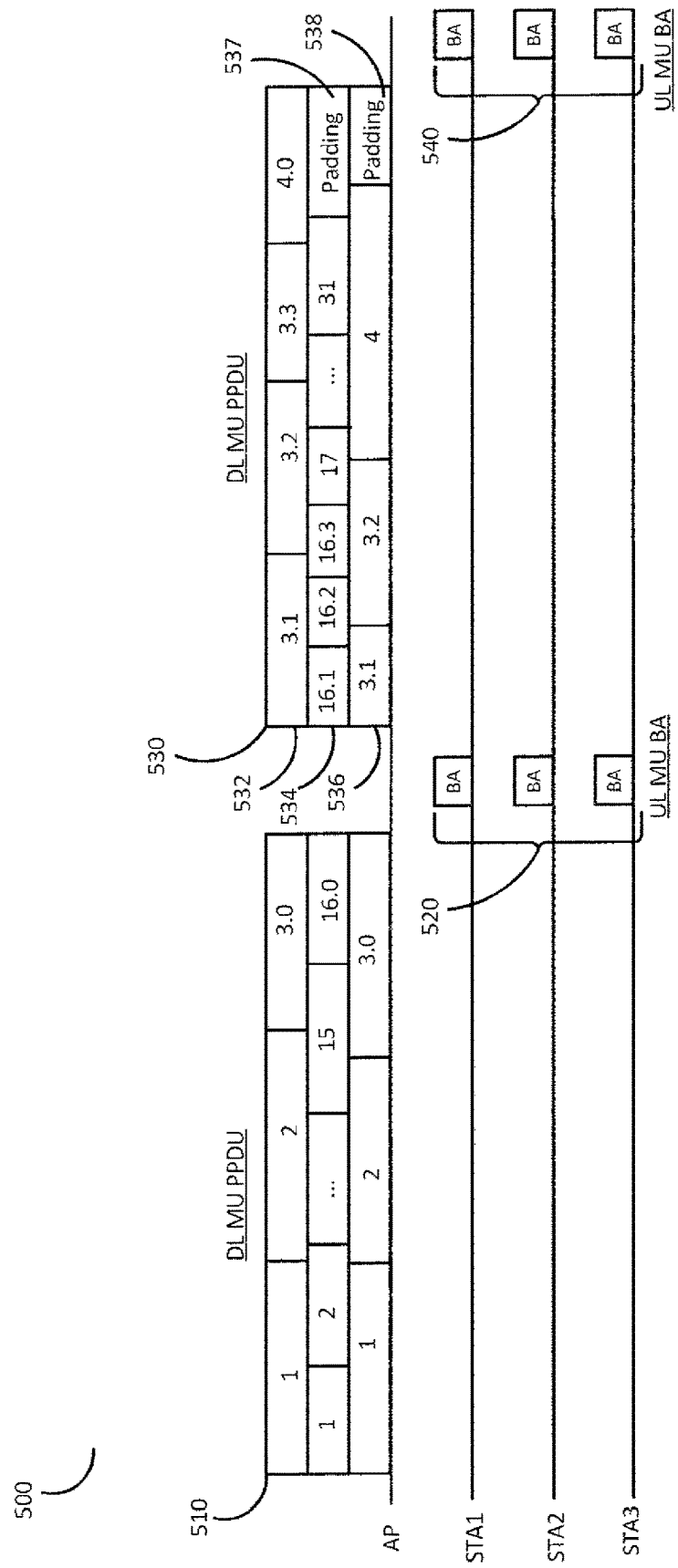

[Fig. 6A]
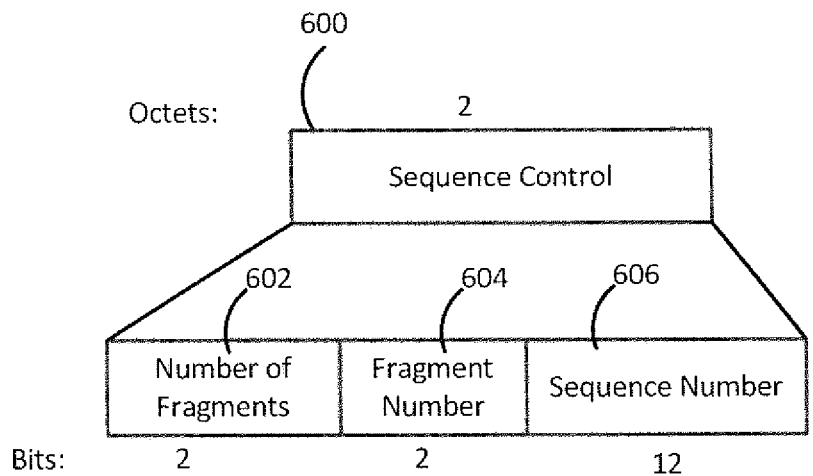
[Fig. 6B]
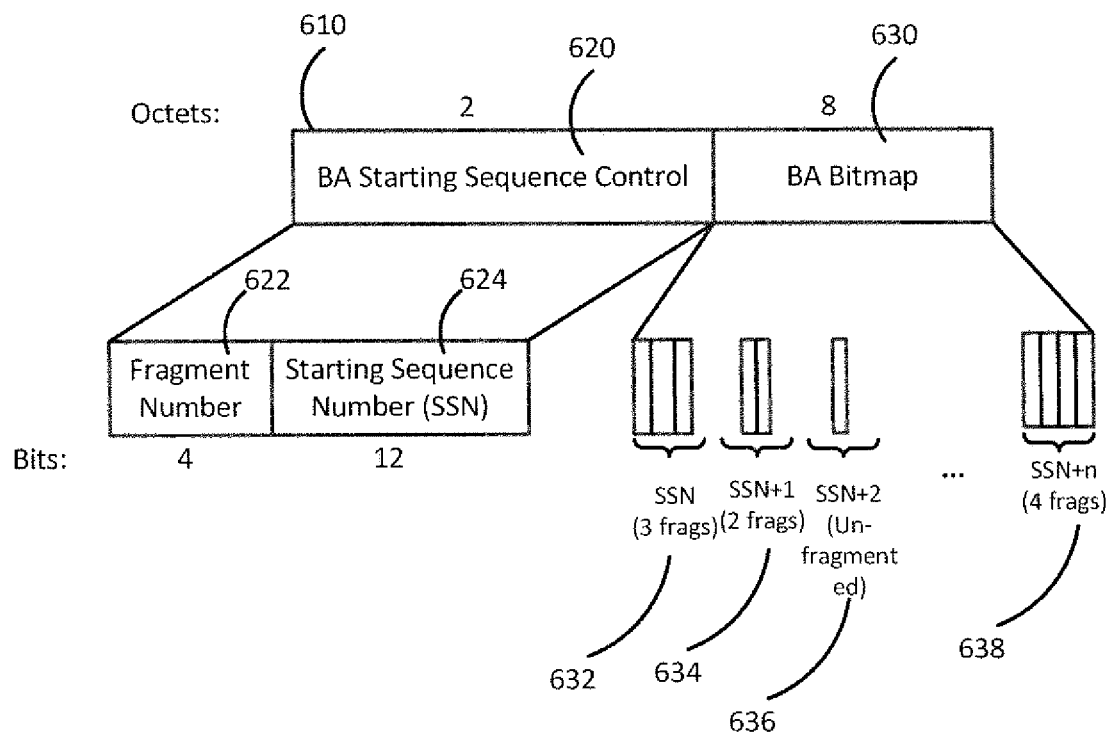

[Fig. 6C]
| Number of Fragments | Description |
|---|---|
| 0 | 1 fragment per MSDU i.e. the MSDU is not fragmented |
| 1 | 2 fragments per MSDU i.e. the MSDU |
| 2 | 3 fragments per MSDU i.e. the MSDU |
| 3 | 4 fragments per MSDU i.e. the MSDU |
640
[Fig. 7A]
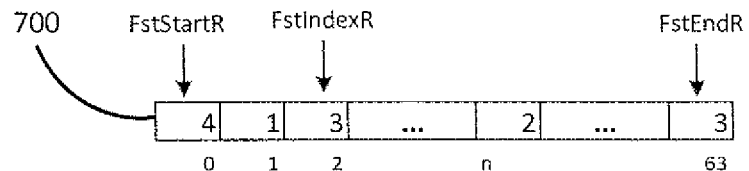

[Fig. 7B]
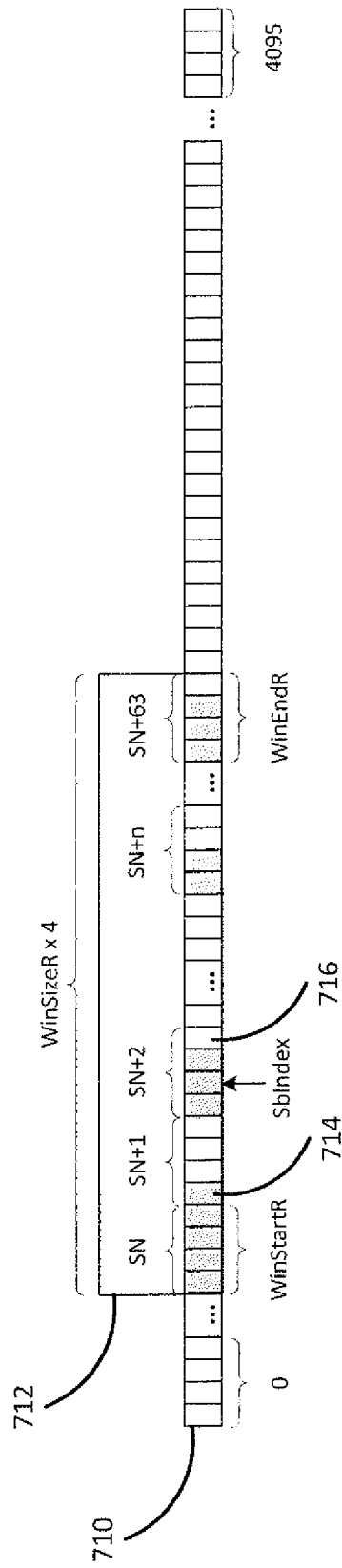

[Fig. 7C]
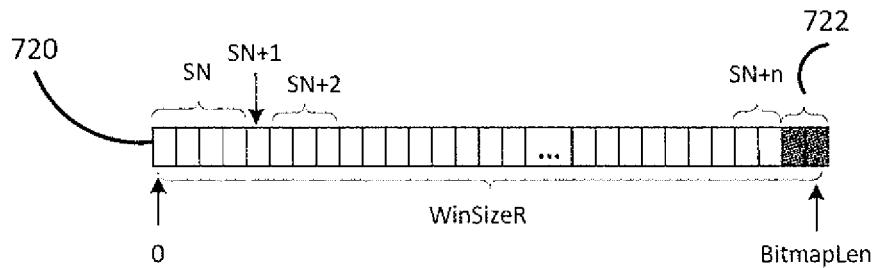
[Fig. 8A]
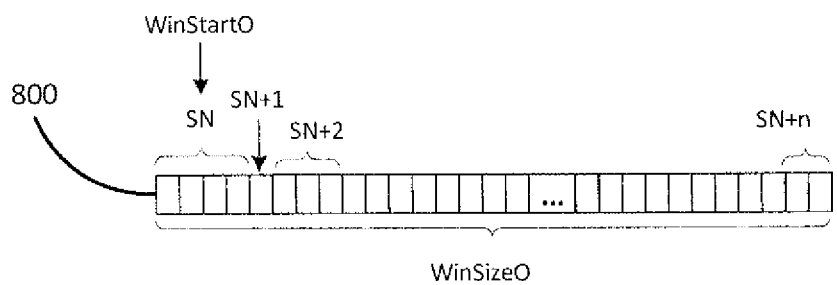
[Fig. 8B]
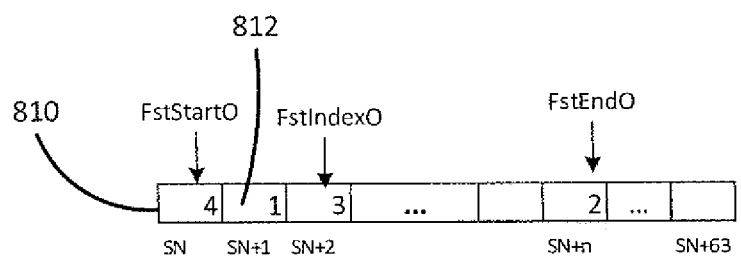
[Fig. 8C]
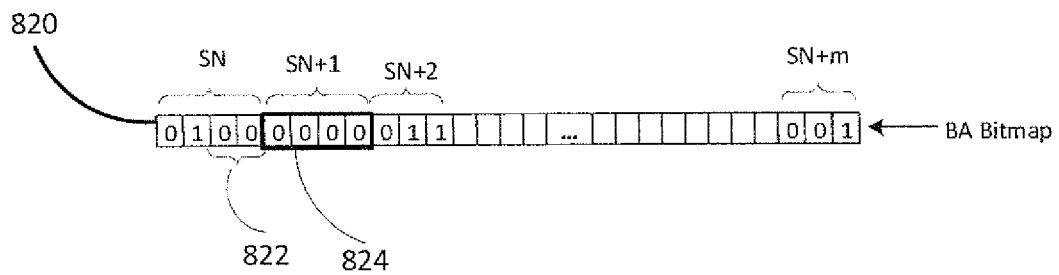

[Fig. 9A]
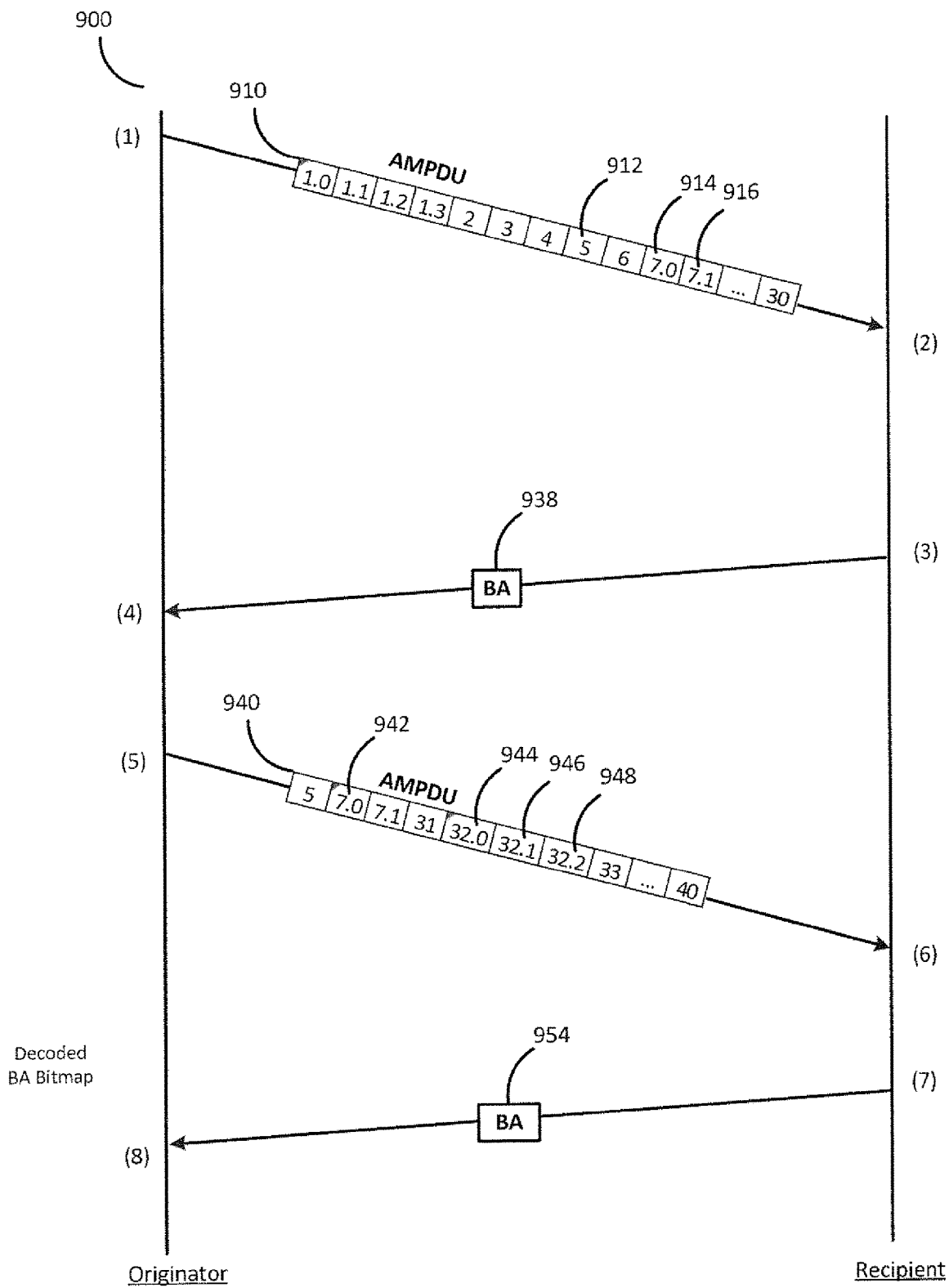

[Fig. 9B]
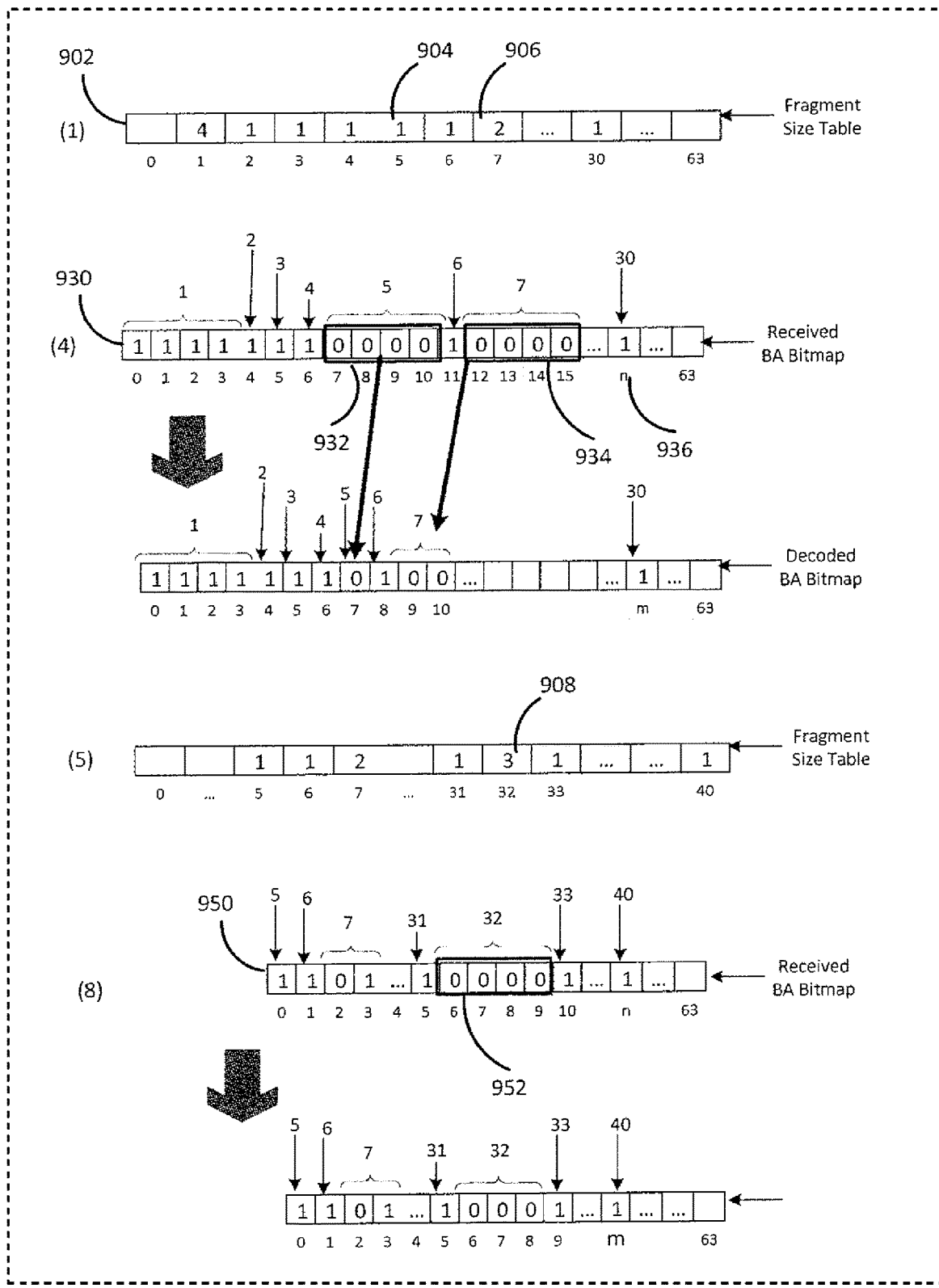

[Fig. 9C]
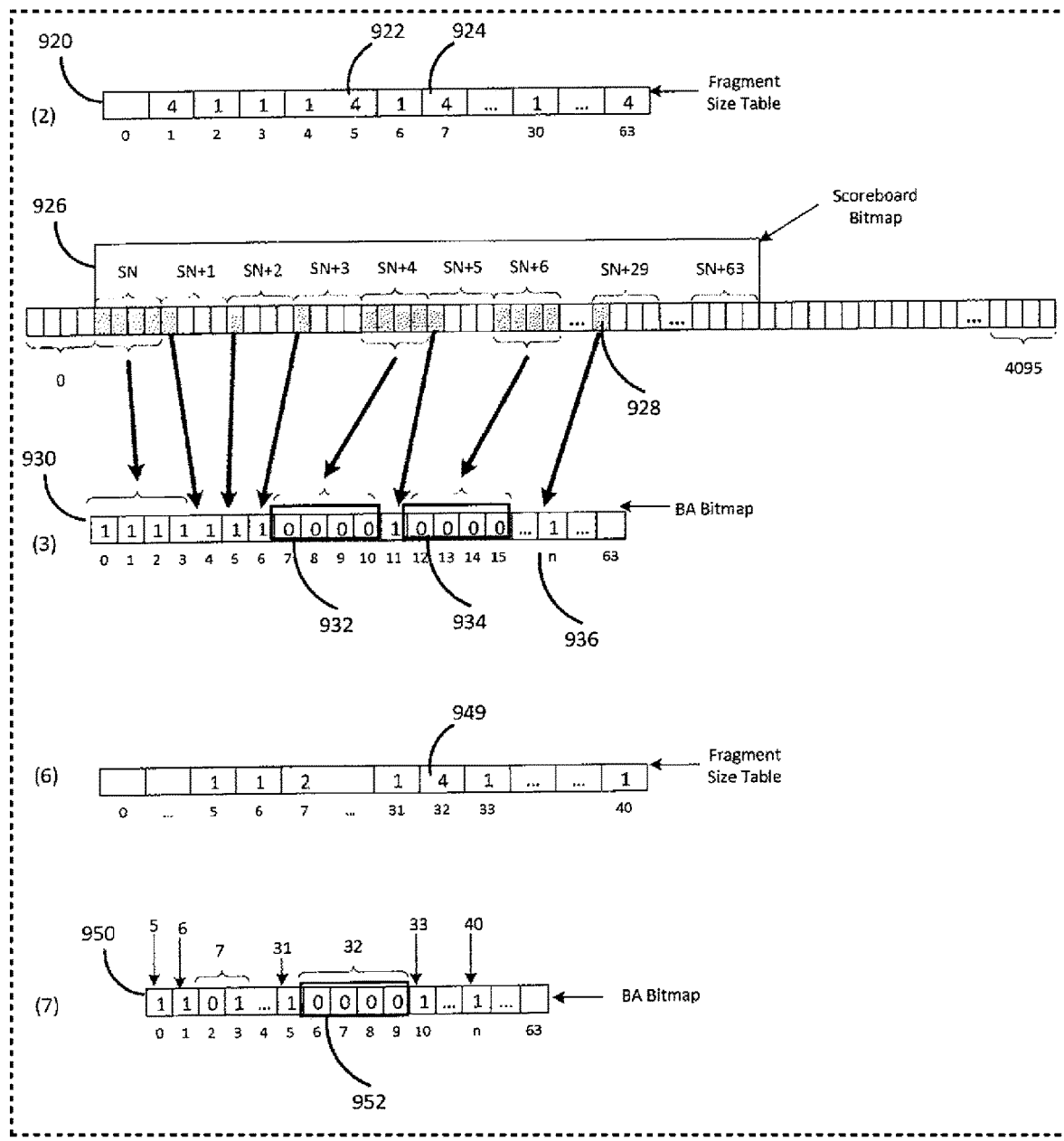

[Fig. 10A]
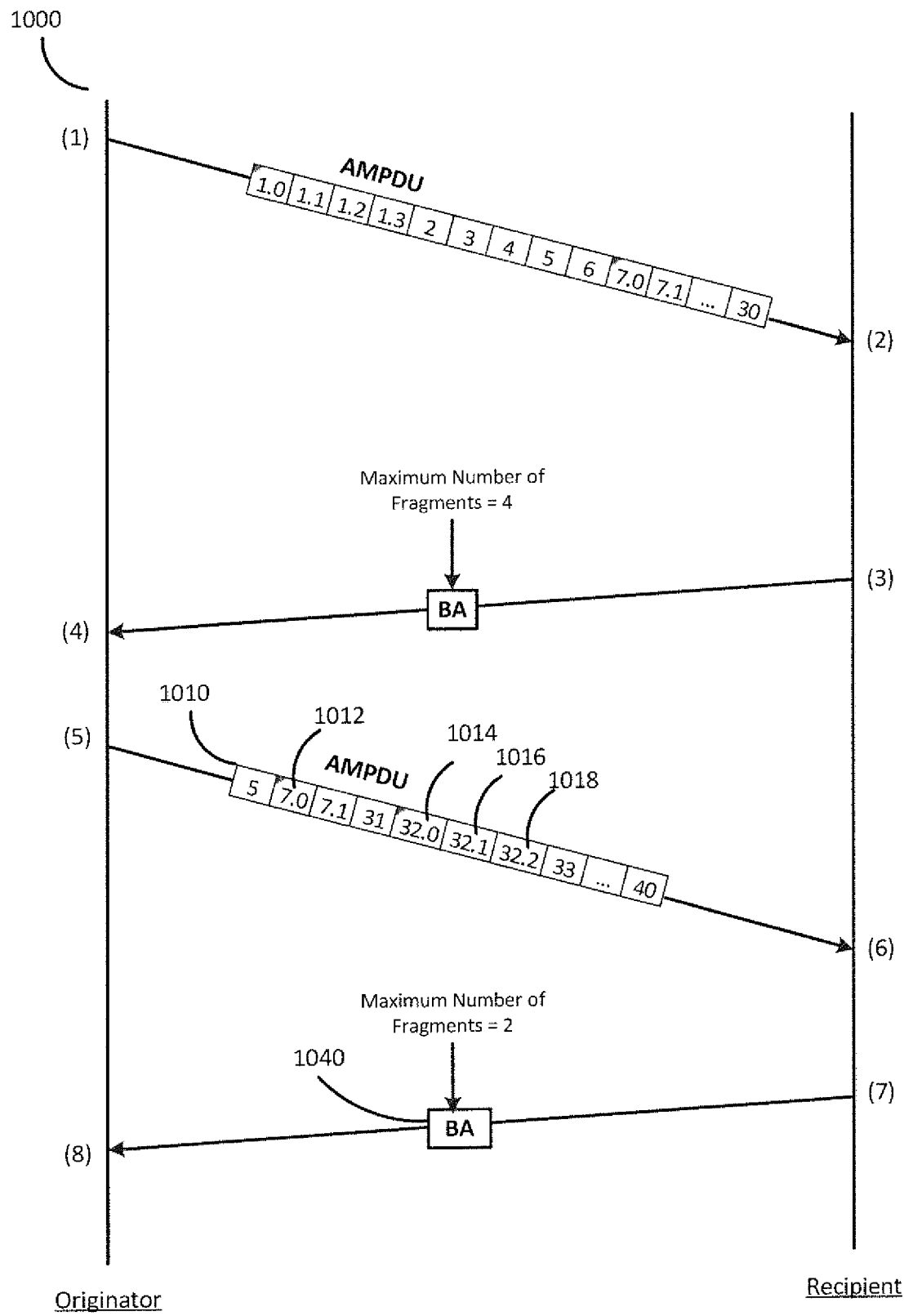

[Fig. 10B]
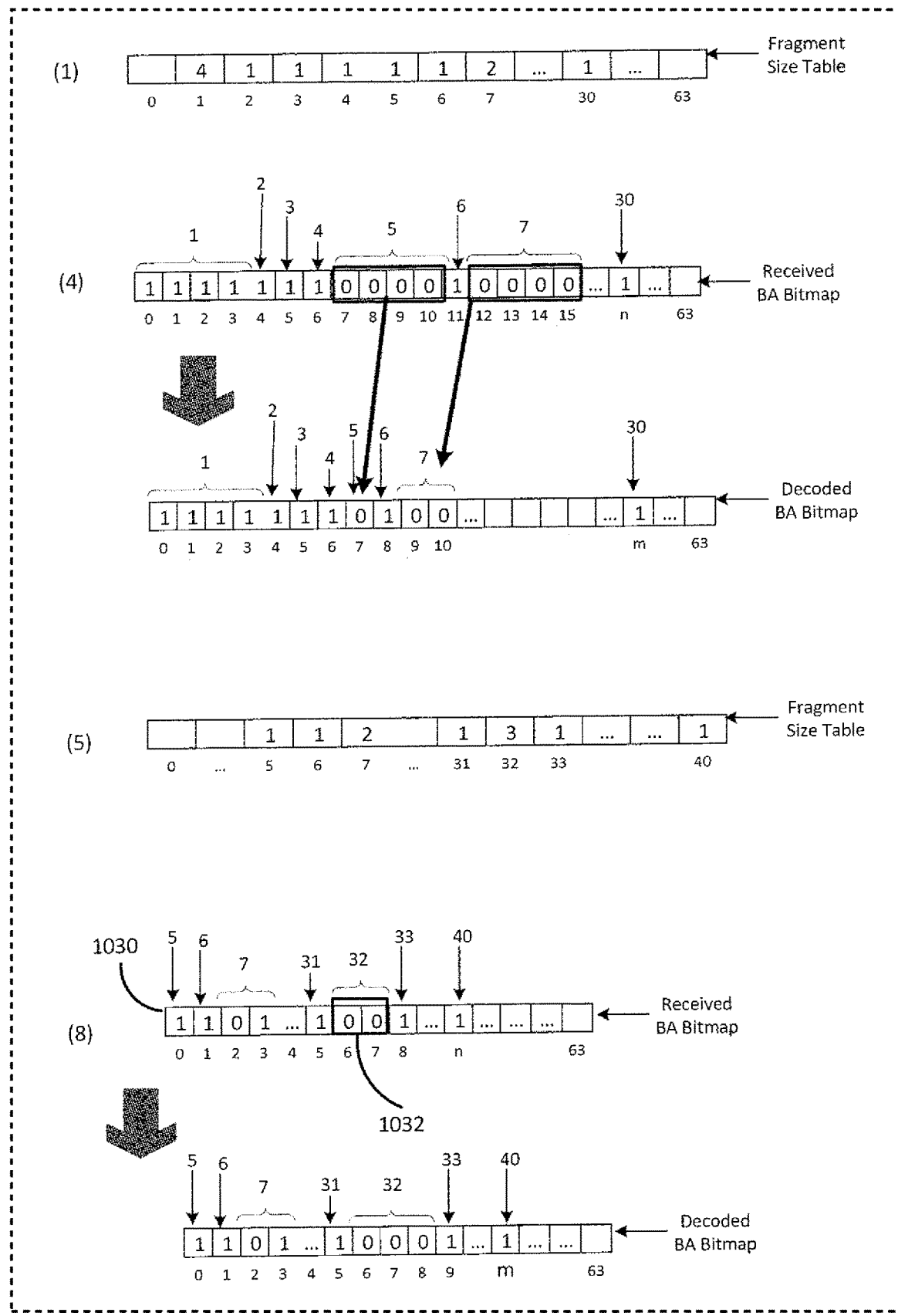

[Fig. 10C]
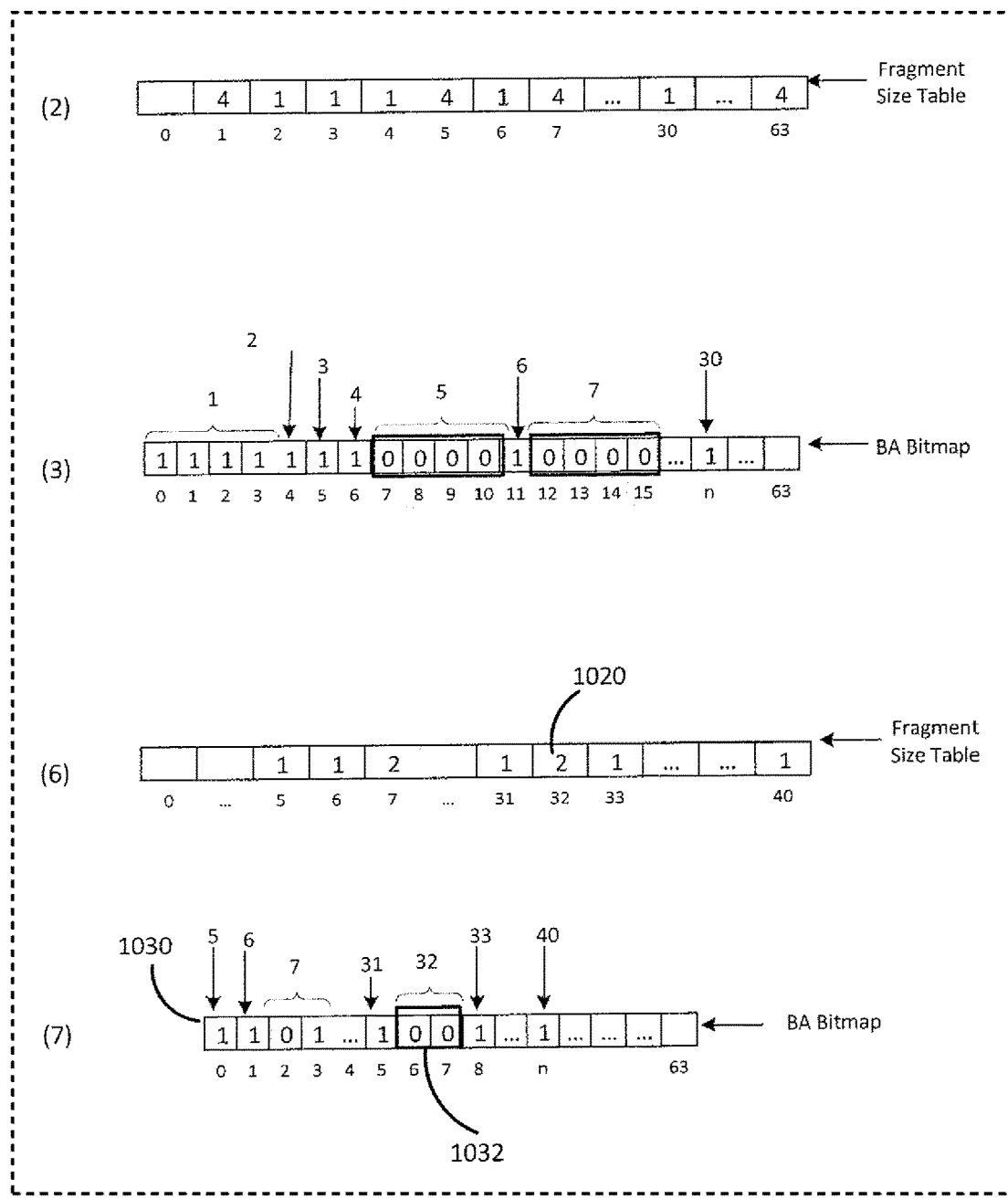
[Fig. 11A]
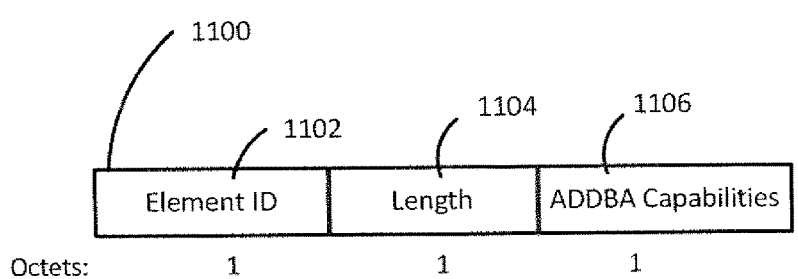

[Fig. 11B]
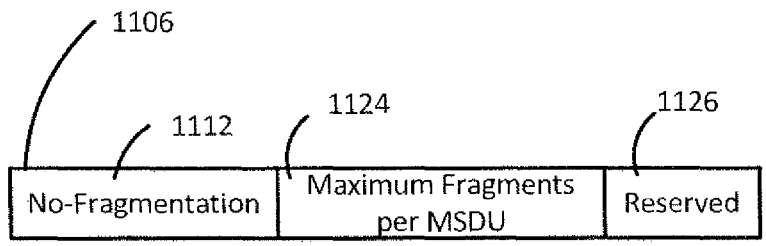
[Fig. 11C]
| Maximum Fragments per MSDU | Description |
| --- | --- |
| 0 | Maximum 2 fragments allowed per MSDU |
| 1 | Maximum 4 fragments allowed per MSDU |
| 2 | Maximum 8 fragments allowed per MSDU |
| 3 | Maximum 16 fragments allowed per MSDU |

[Fig. 11D]
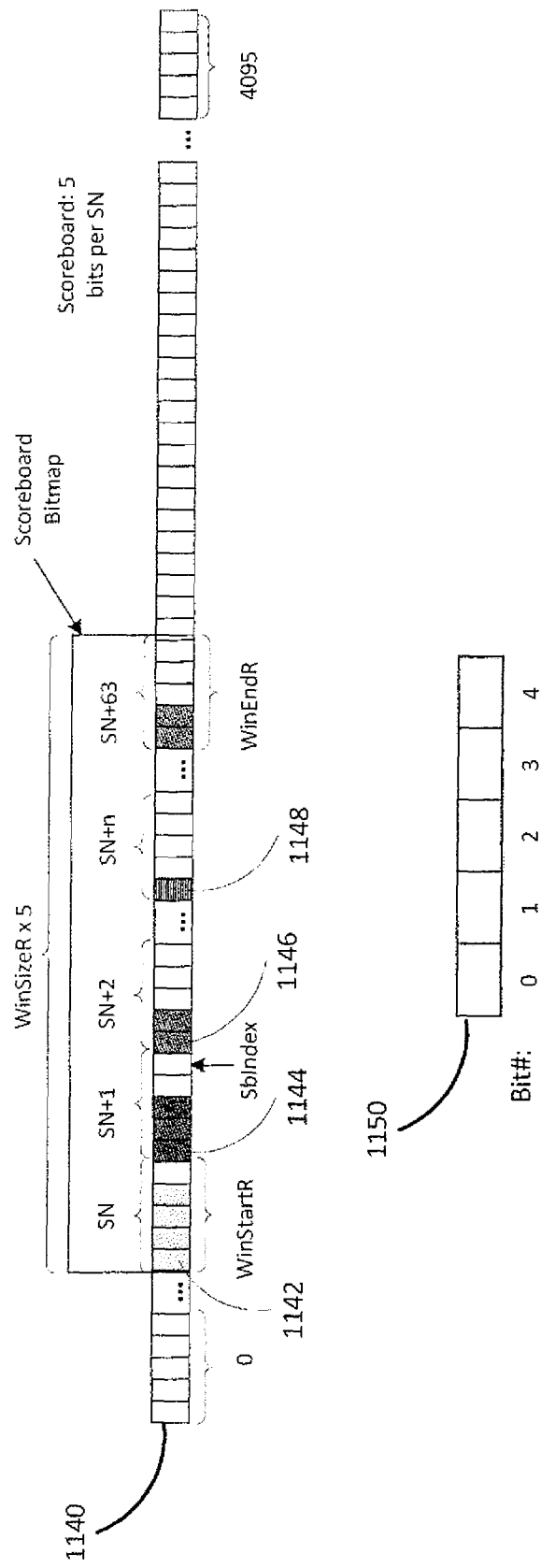

[Fig. 11E]
1160
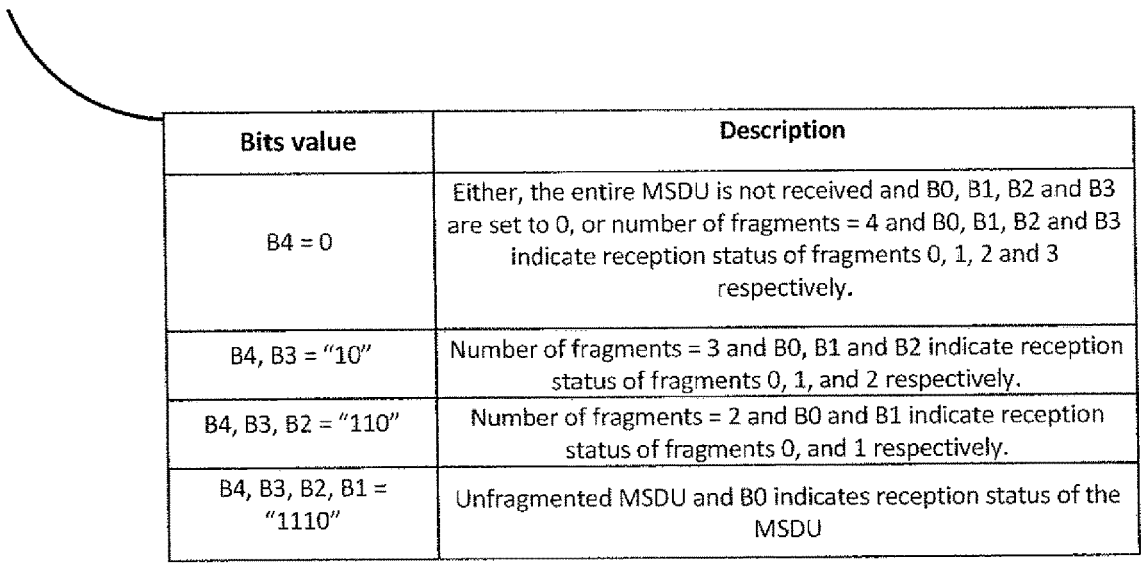
[Fig. 12A]
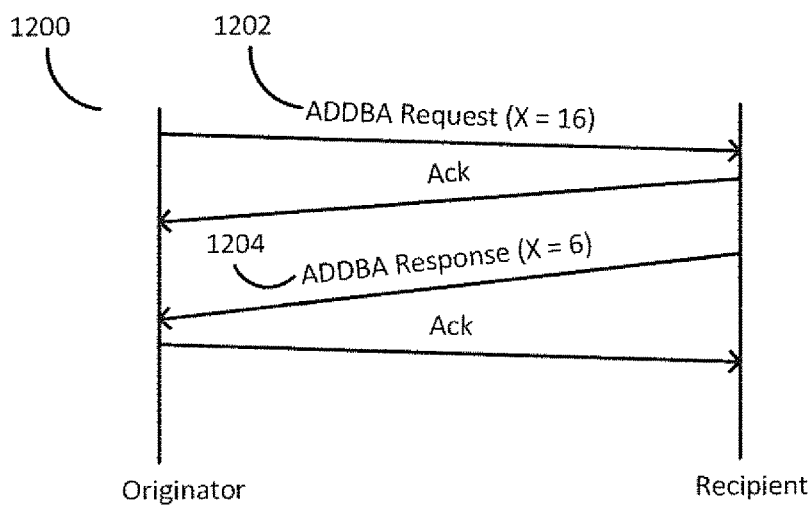

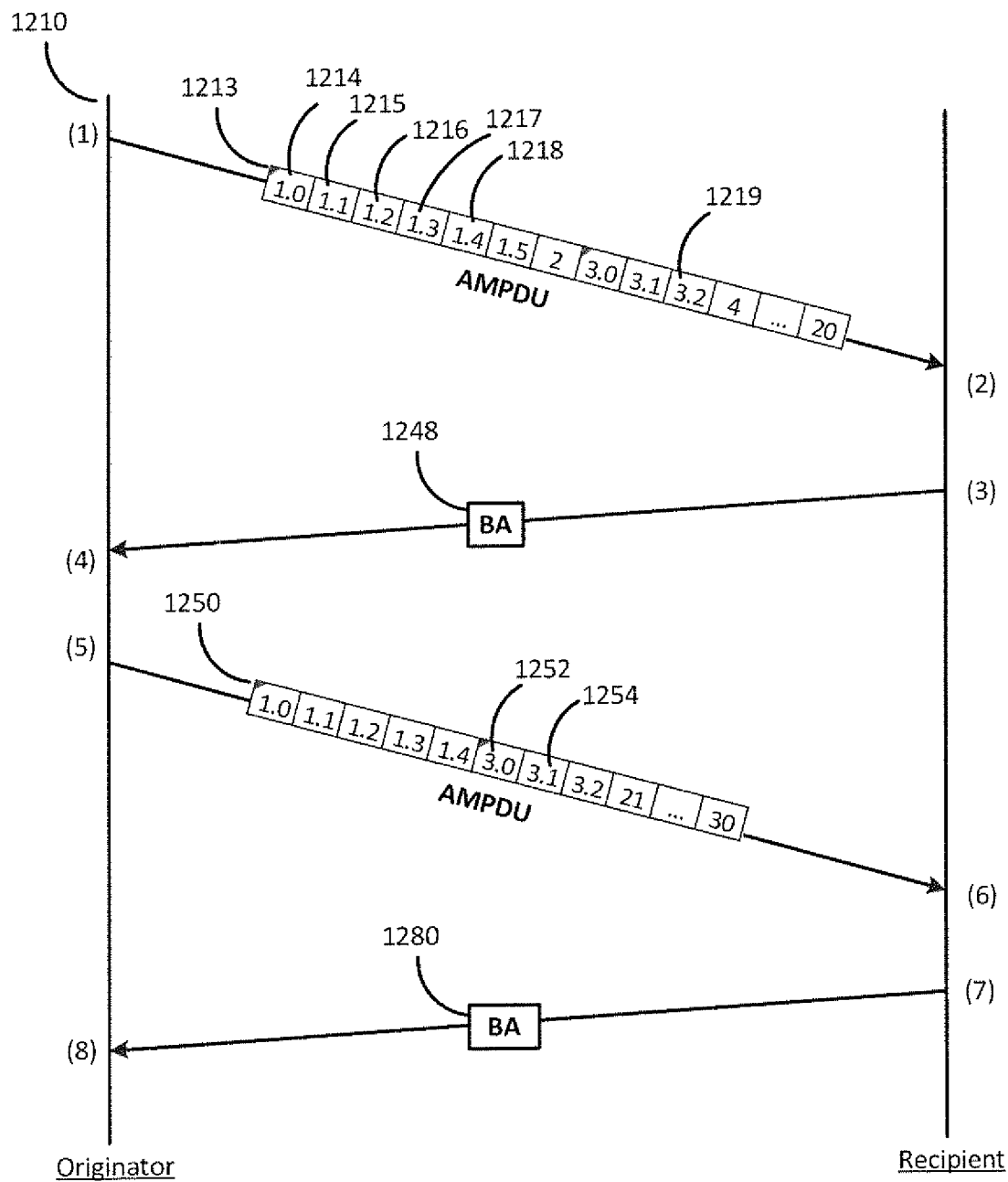
[Fig. 12B]

[Fig. 12C]
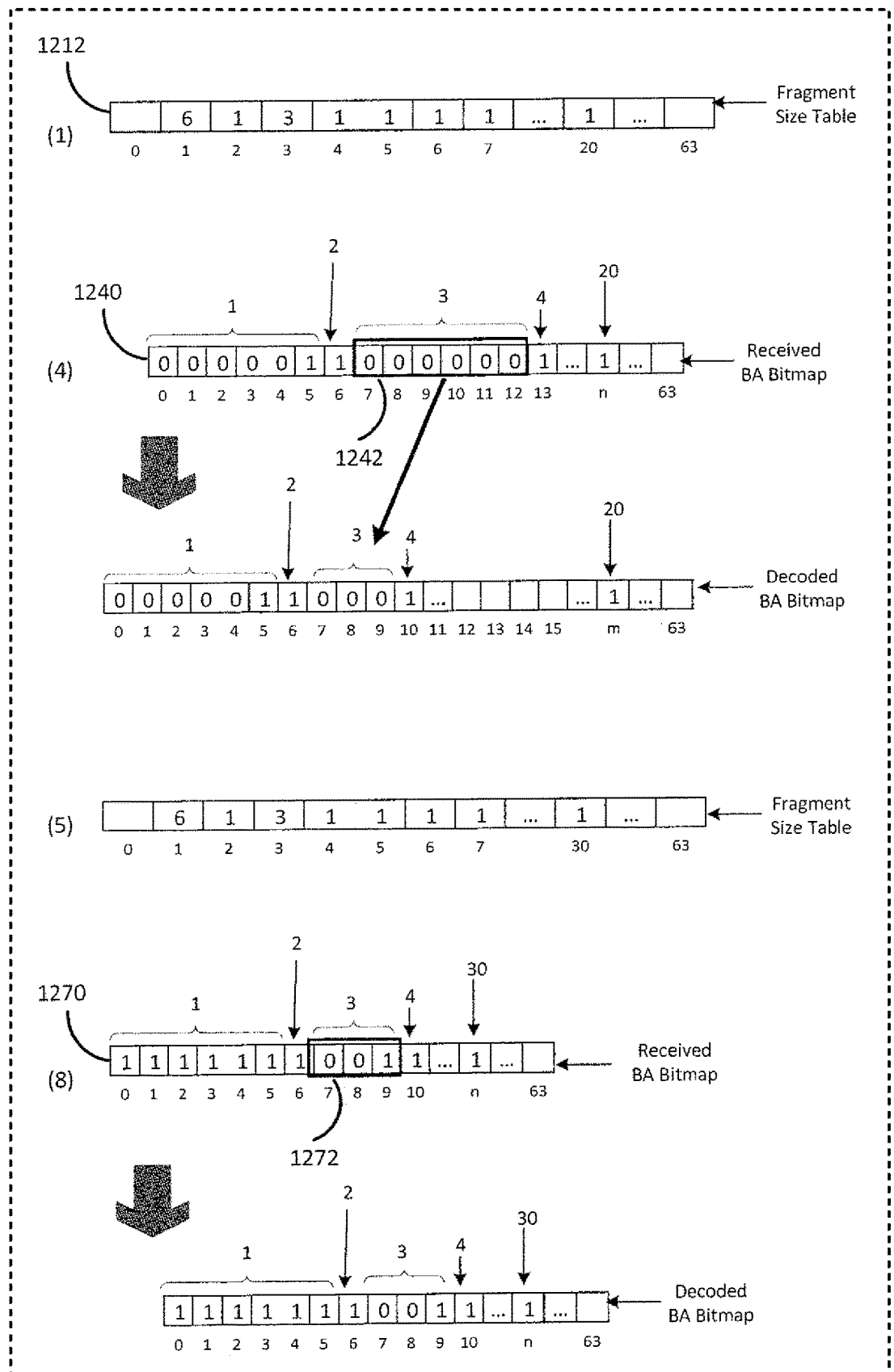

[Fig. 13A]
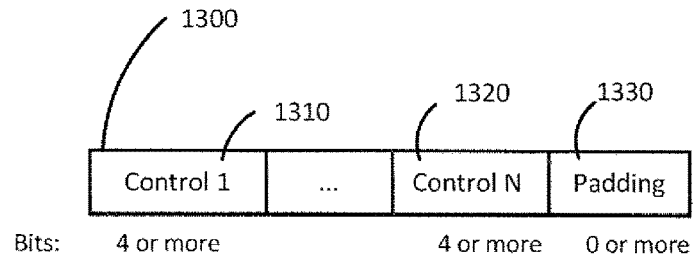
[Fig. 13B]
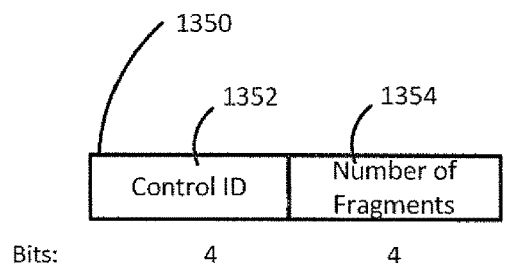
[Fig. 14A]
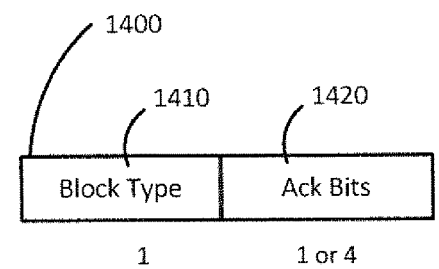
[Fig. 14B]
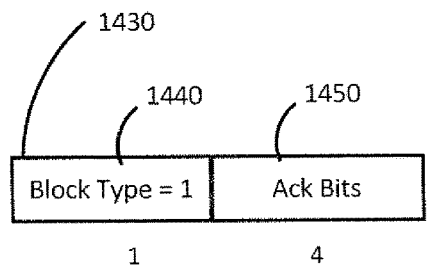
[Fig. 14C]
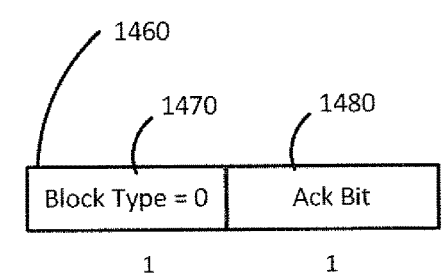

[Fig. 15A]
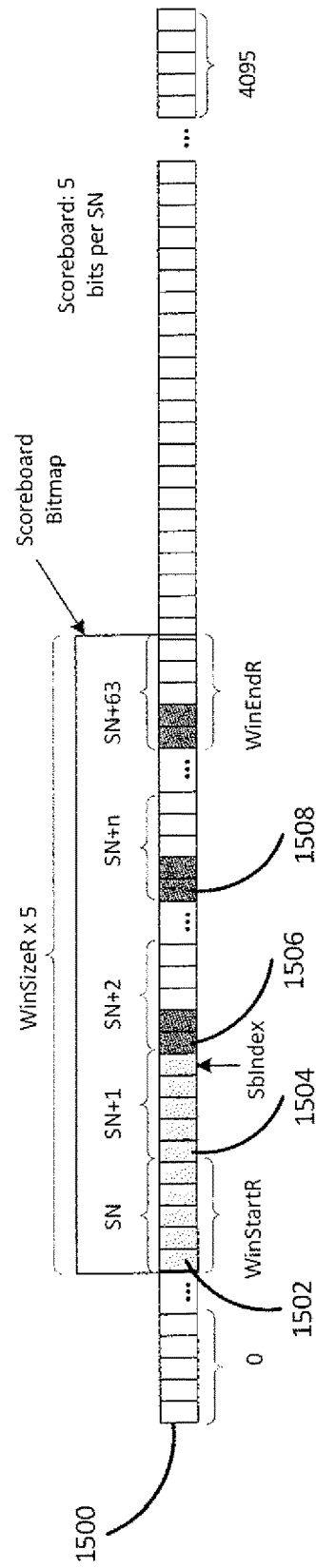

[Fig. 15B]
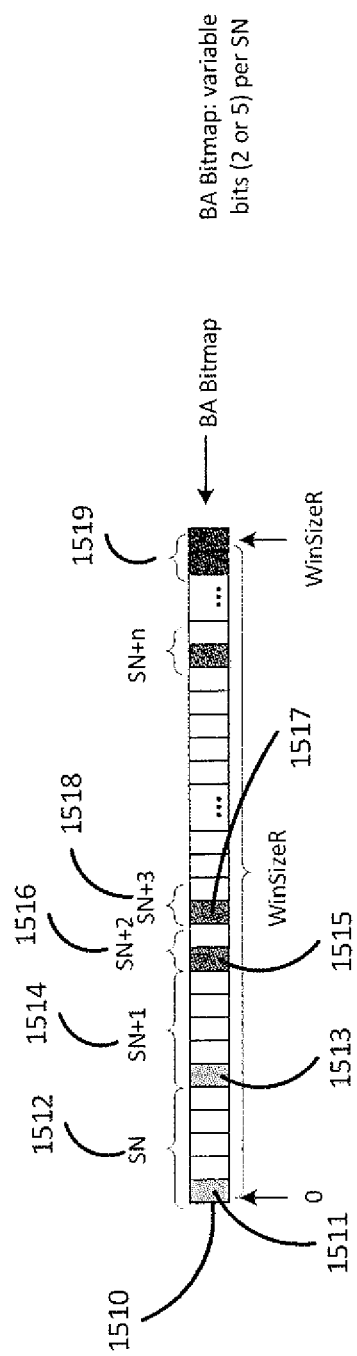

[Fig. 16A]
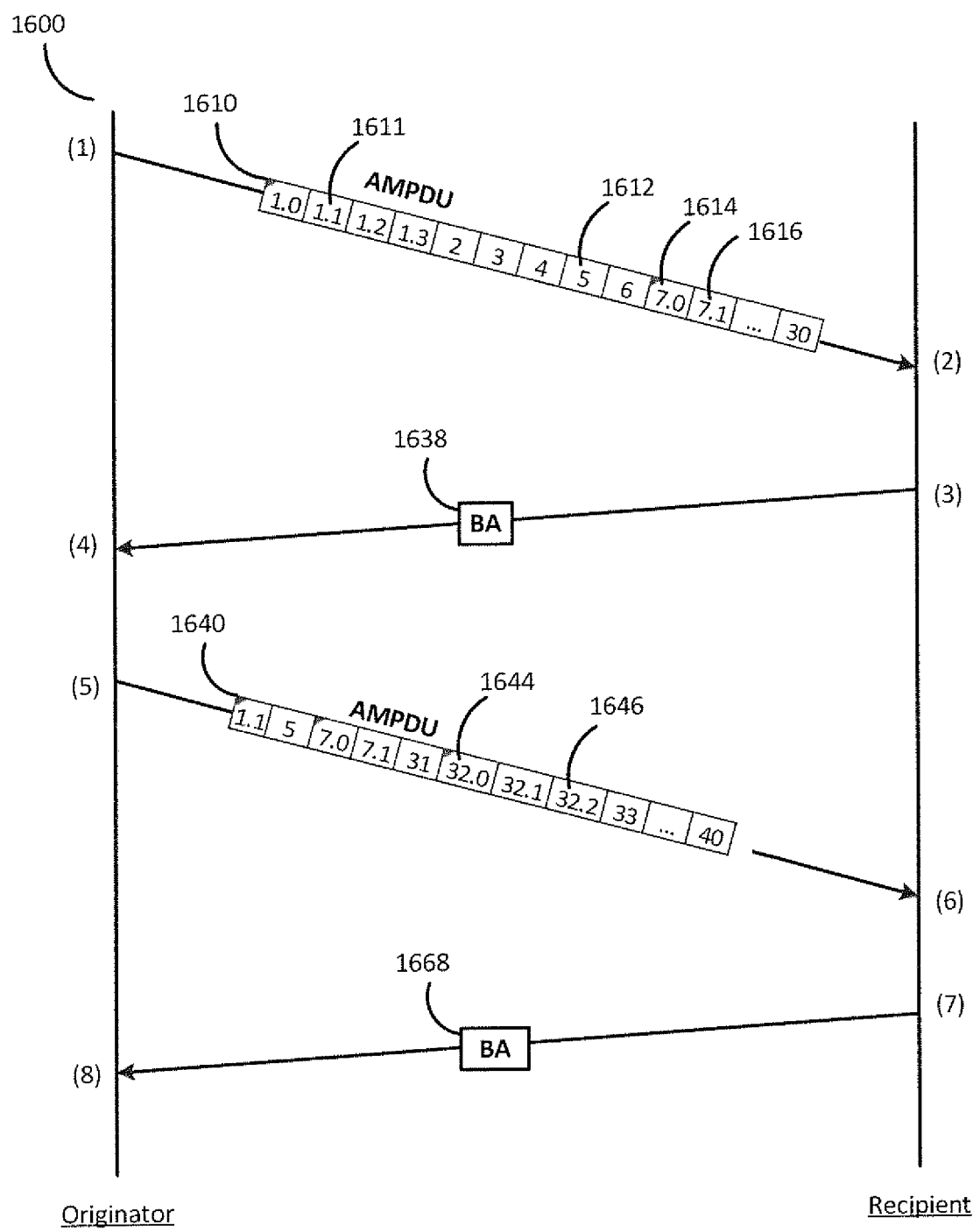

[Fig. 16B]
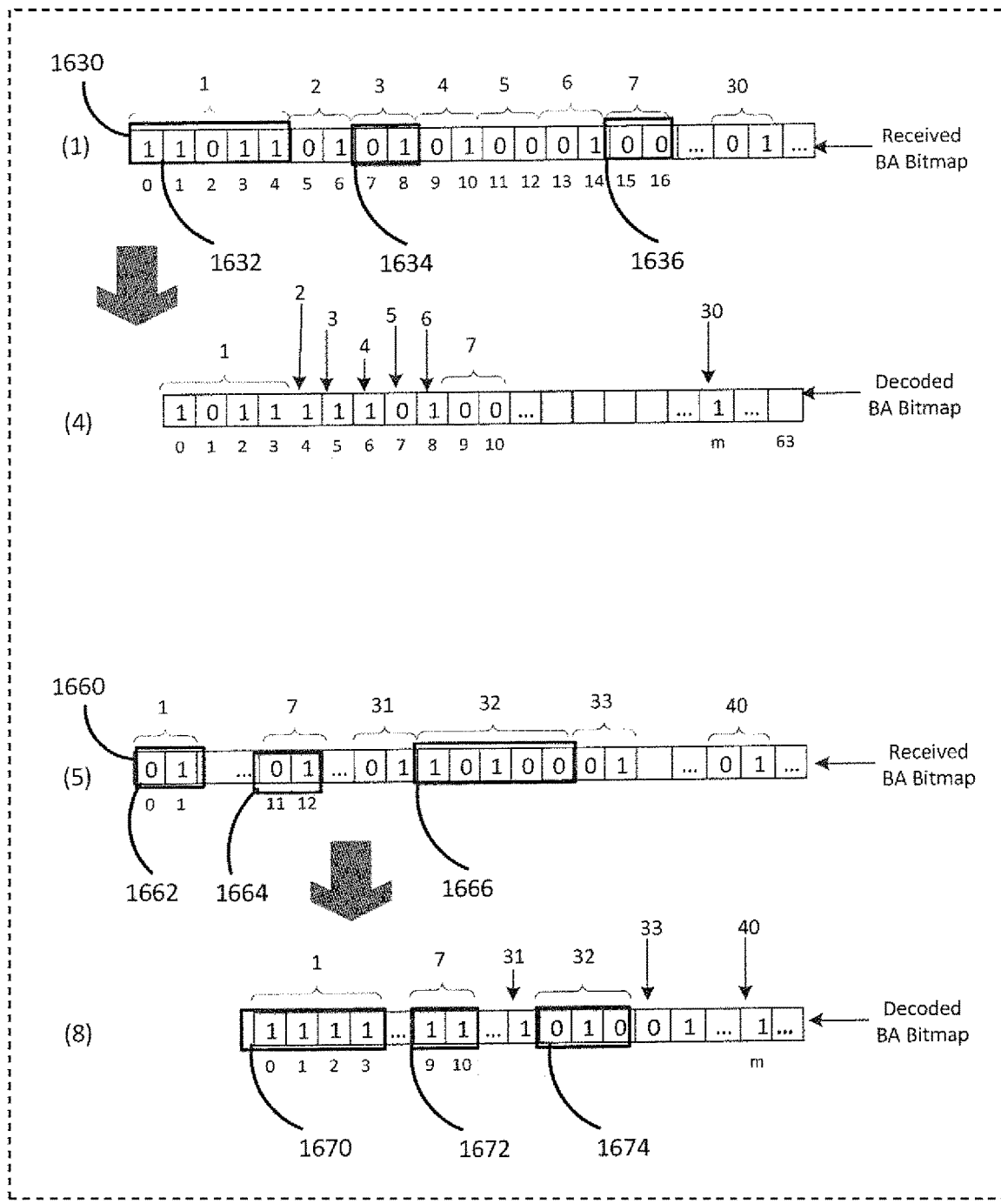

[Fig. 17]
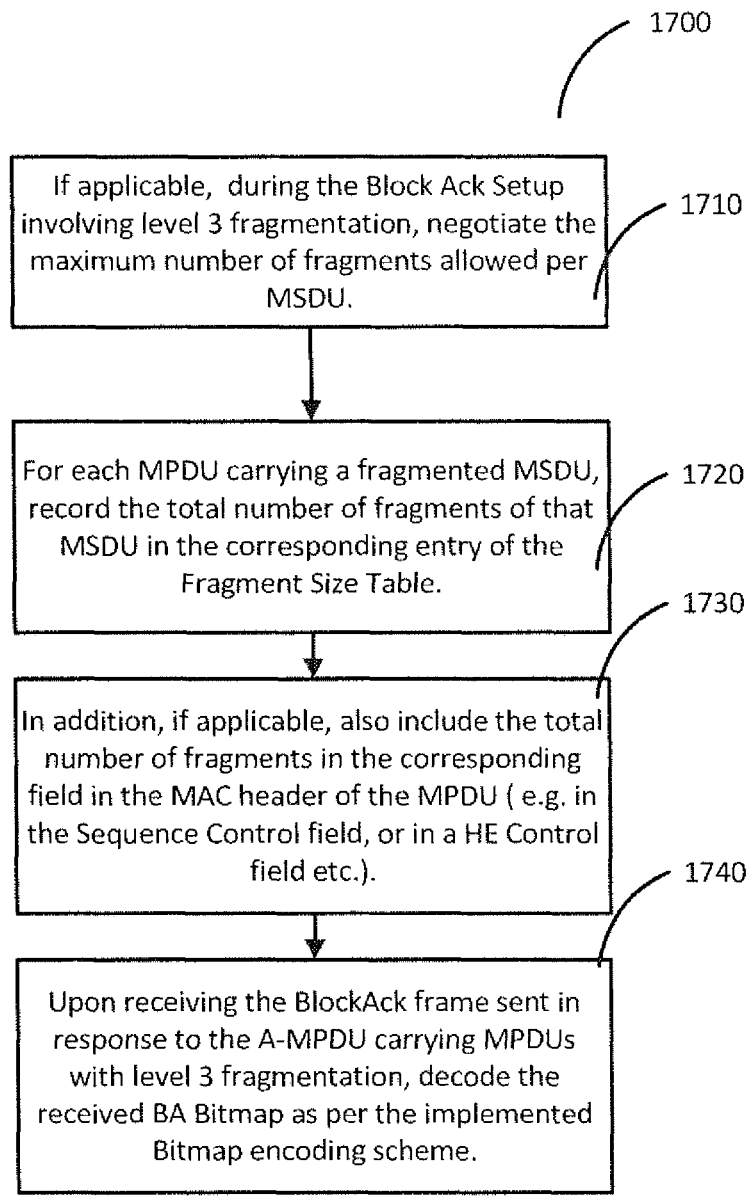

[Fig. 18]
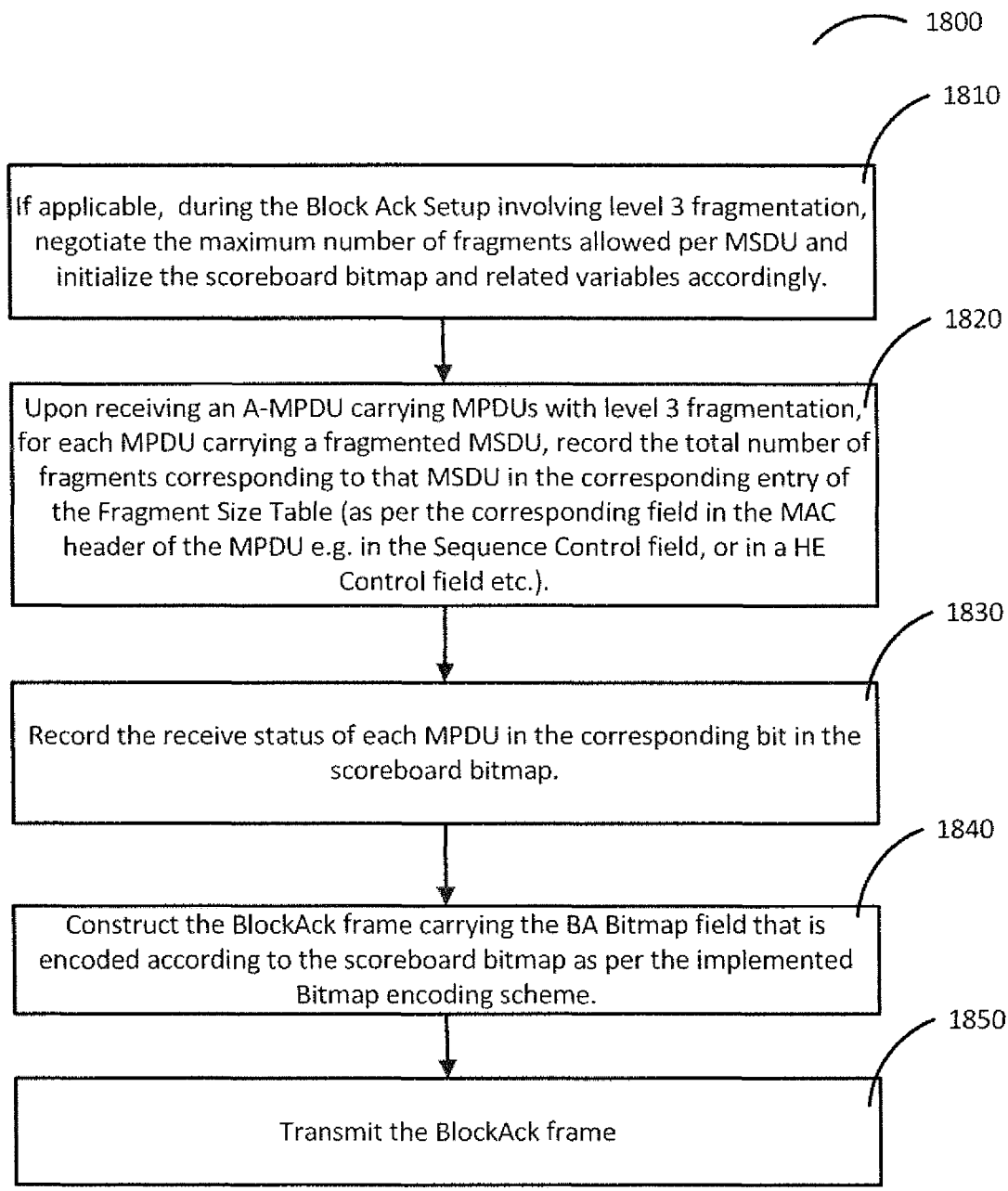

[Fig. 19A]
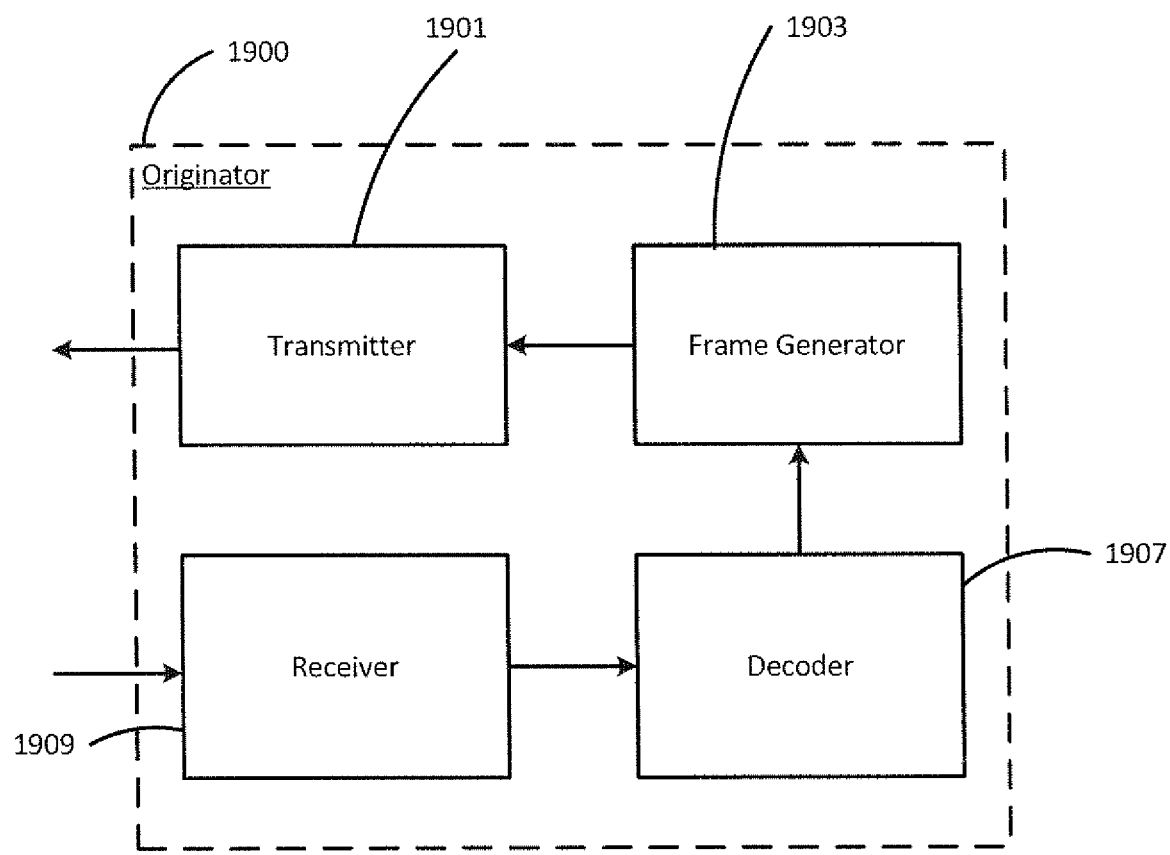

[Fig. 19B]
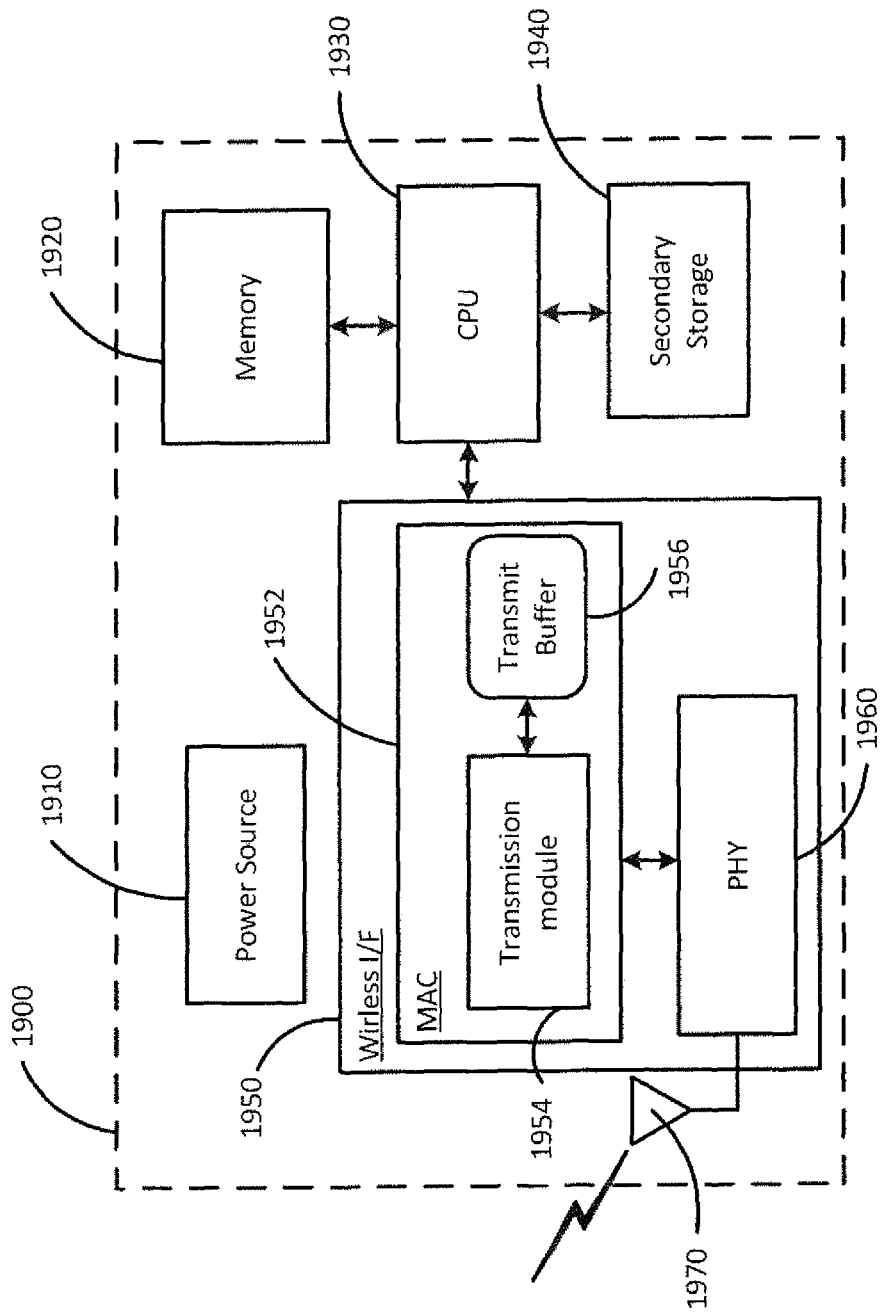

[Fig. 20]
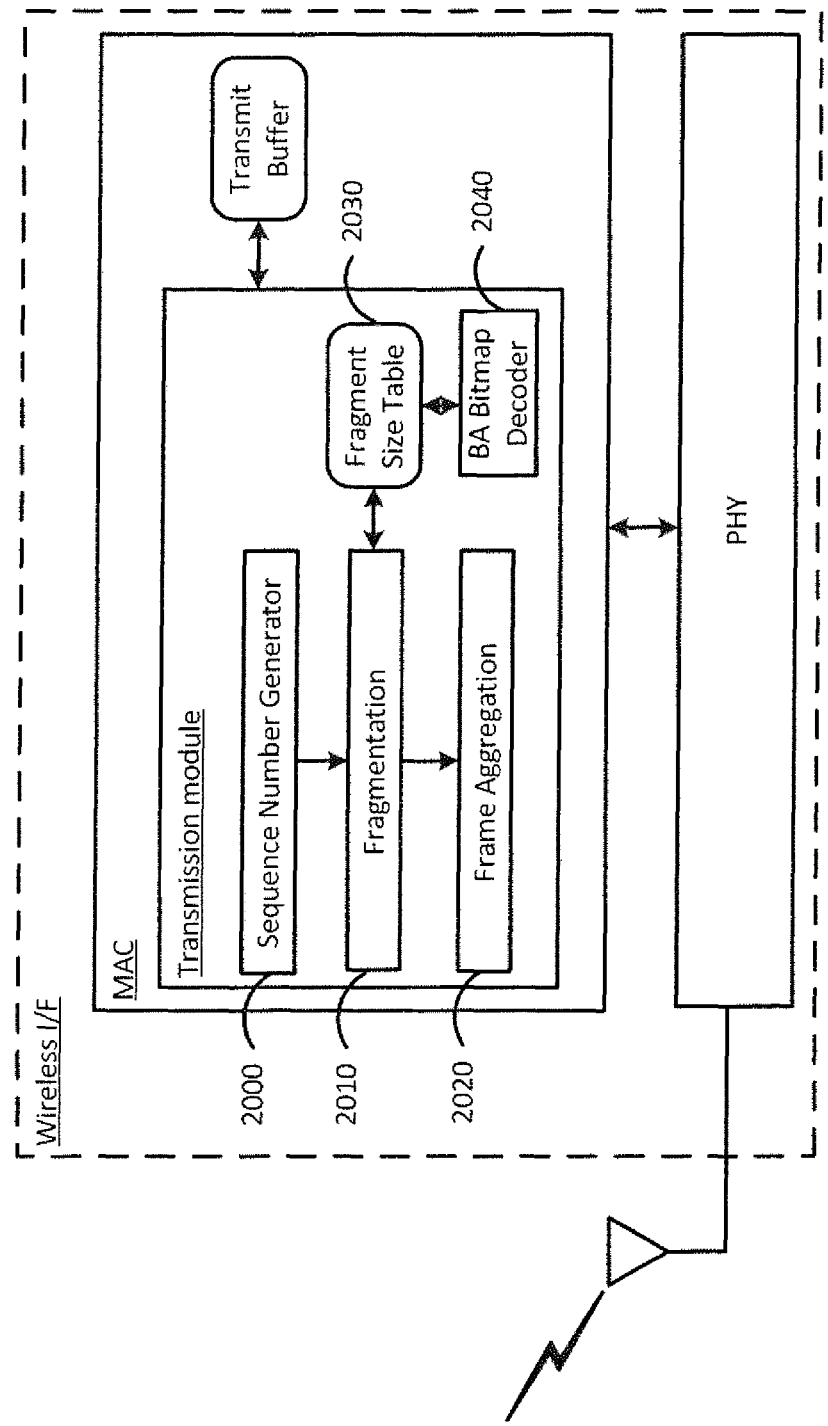

[Fig. 21A]
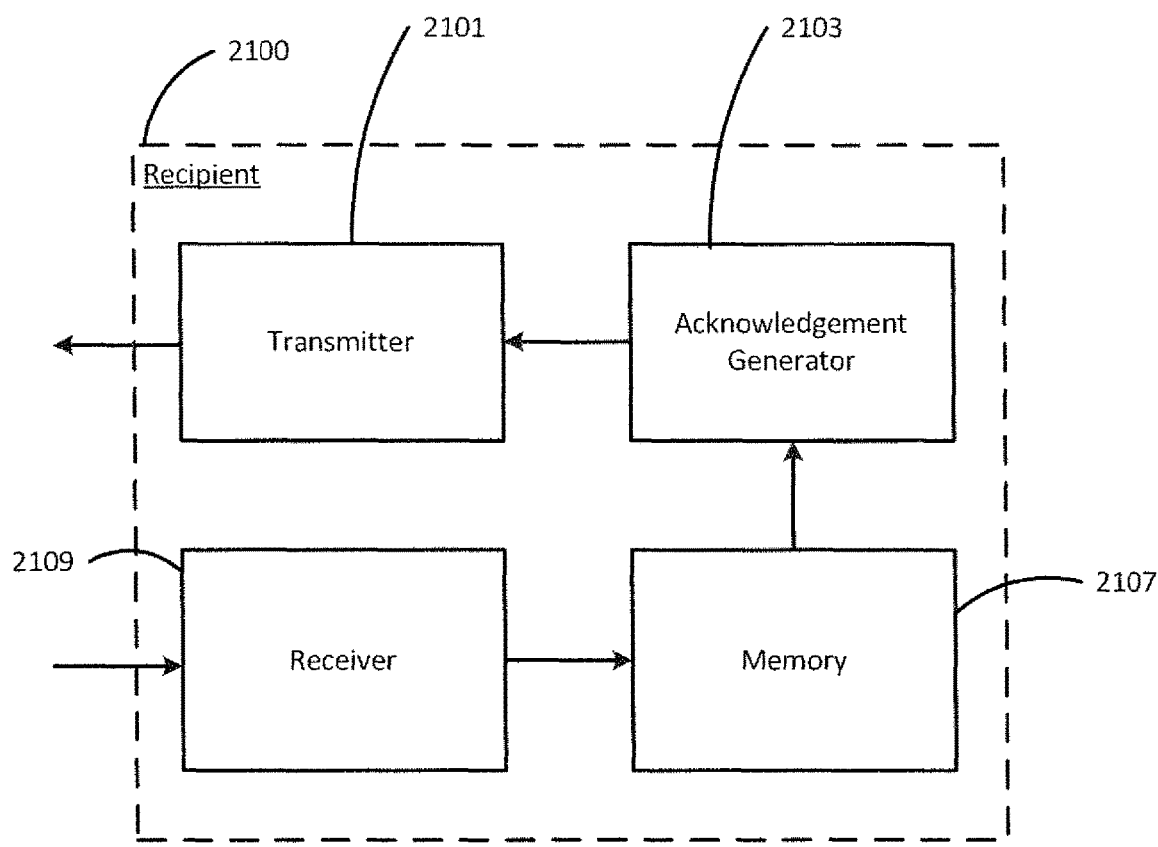

[Fig. 21B]
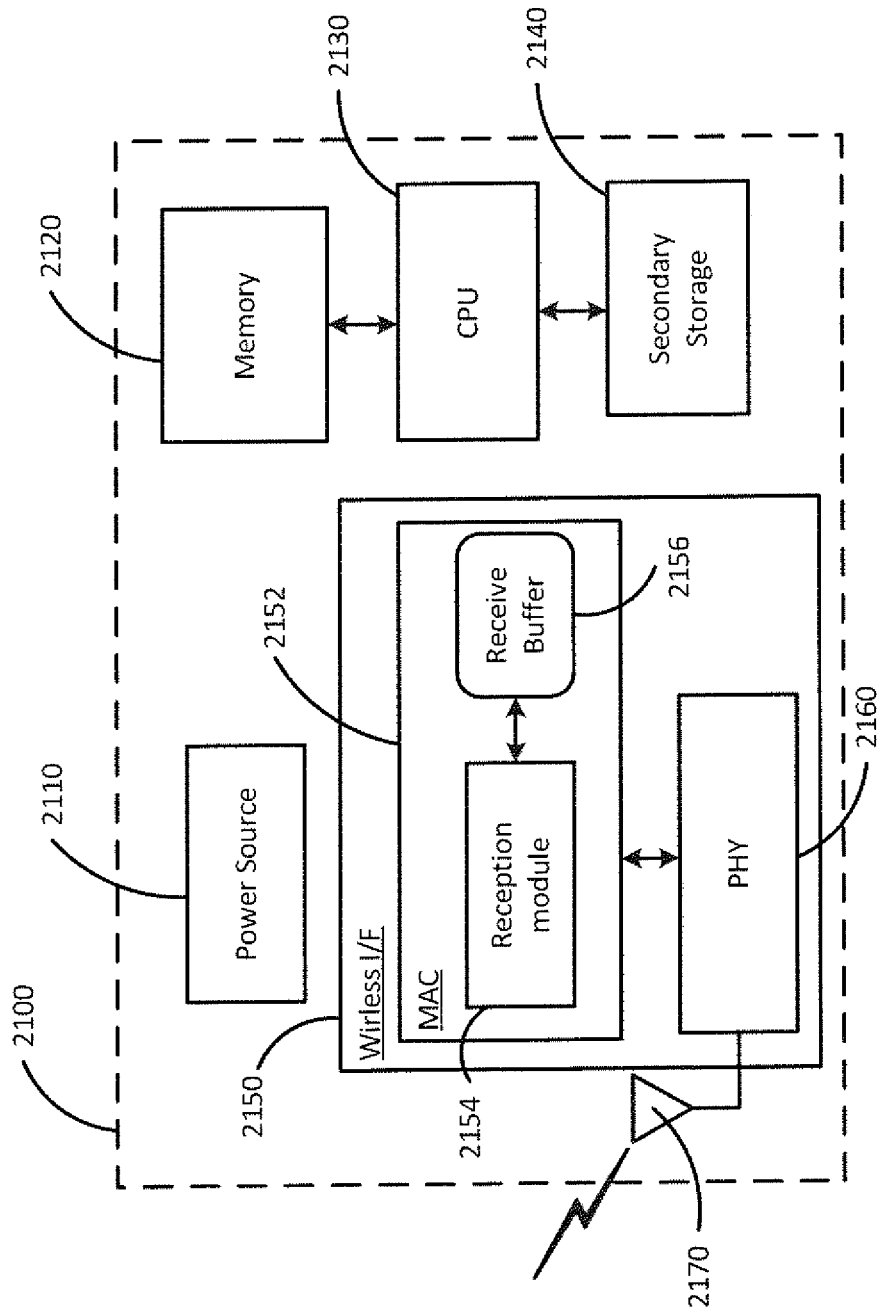

[Fig. 22]
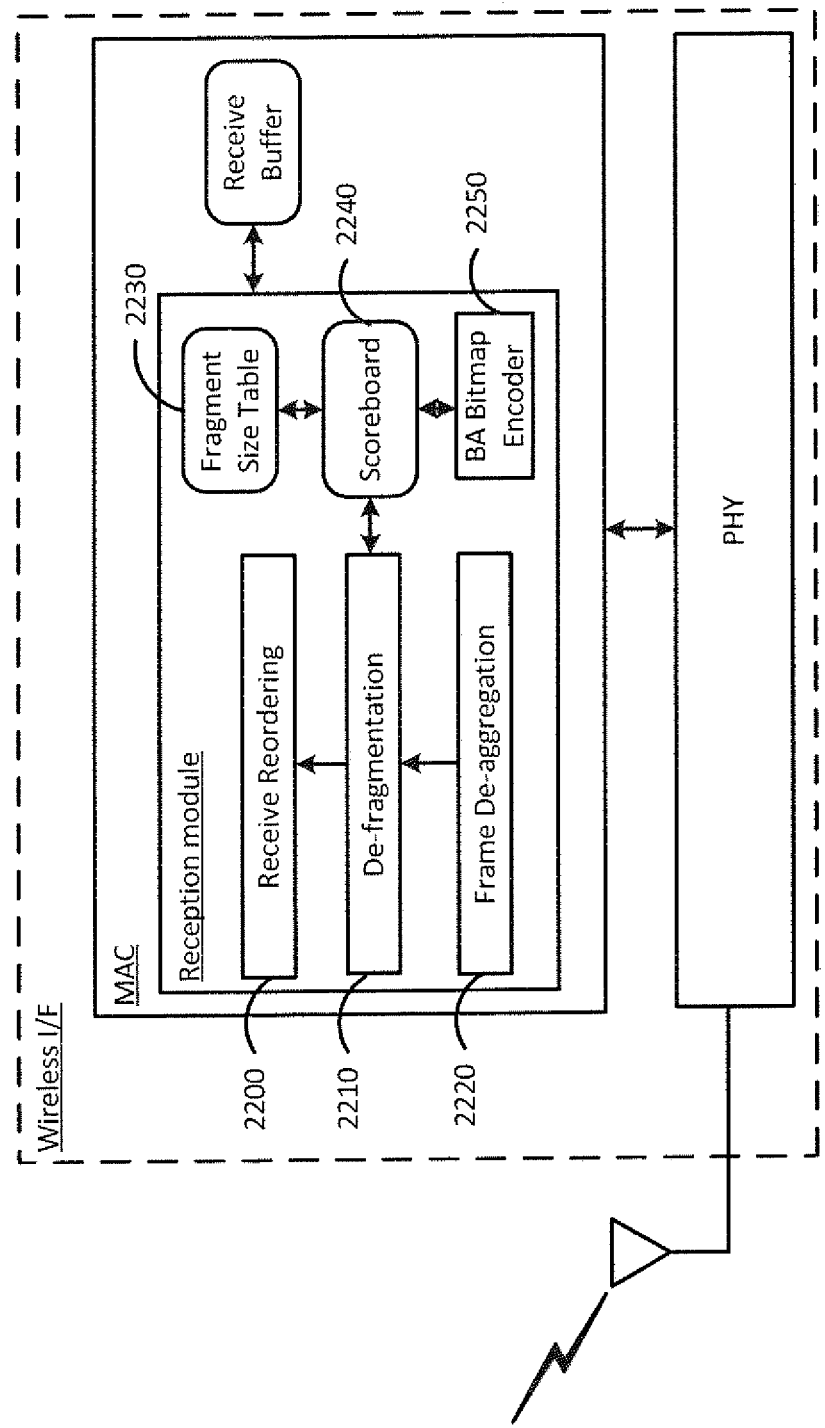

COMMUNICATION METHOD AND COMMUNICATION APPARATUS FOR BLOCK ACKNOWLEDGMENT TRANSMISSION

TECHNICAL FIELD

The present disclosure is generally related to a communication apparatus and a communication method for Block Acknowledgement transmission.

BACKGROUND ART

IEEE (Institute of Electrical and Electronics Engineers) 802.11 Working group is currently in the process of standardizing the next generation WLAN (Wireless Local Area Network) technology under the 802.11ax Taskgroup. The primary goal of the Taskgroup is the improvement of spectrum efficiency to enhance the system throughput/area in high density scenarios of Access Points (AP) and/or terminal Stations ("non-AP STA" or simply STA in the rest of the document). A device based on the IEEE 802.11ax specification is generally termed as a High Efficiency (HE) device. Among the various technologies being proposed, Orthogonal Frequency-Division Multiple Access (OFDMA) and uplink multi-user transmission are two key technologies that the IEEE 802.11ax Taskgroup has adopted to achieve the throughput improvement goals. FIG. 1 illustrates an example 802.11ax WLAN 100 with an AP 190 and several STAs associated with the AP 190.

One of the features used in 802.11 to increase the transmission reliability, especially in low data rate situations, is called fragmentation. Fragmentation is the process of partitioning a MAC Service Data Unit (MSDU) or a MAC Management Protocol Data Unit (MMPDU) into smaller MAC level frames, MAC Protocol Data Units (MPDU). For the sake of brevity, in the rest of the disclosure, the term MSDU is used to represent both MSDU as well as MMPDU. At low data rates, an unfragmented MSDU can occupy a large amount of air time. A bit error in the frame would result in the entire frame being retransmitted. With fragmentation, the MSDU would be broken into smaller segments and each segment would be encapsulated in an MPDU and sent in a separate PLCP protocol data unit (PPDU). This would result in only an MPDU carrying an errored segment being retransmitted. The reverse process of recombining MPDUs into a single MSDU or MMPDU at the receiver is known as defragmentation.

With the introduction of OFDMA and uplink multi-user transmission in 802.11ax, fragmentation has become relevant again. This is due to the fact that in both Downlink (DL) and Uplink (UL), 802.11ax has made it mandatory for the multi-user transmissions to end at the same time. Since it is unlikely that there will be an exact integer number of MSDUs to fill the available duration allocation (PPDU length), it has been agreed in 802.11ax Working group that instead of applying padding to any unused duration allocation, a fragment of an MSDU may be transmitted. In order to support fragmentation within an Aggregate MPDU (A-MPDU), 802.11ax has introduced a new Compressed Block Acknowledgement (C-BA) frame variant also called as the "Dedicated" C-BA frame. The "Dedicated" C-BA frame can acknowledge multiple fragments of an MSDU per A-MPDU.

CITATION LIST

Non Patent Literature

NPL 1: IEEE802.11-15/0132r14, Specification Framework for TGax, January 2016
NPL 2: IEEE Std 802.11-2012
NPL 3: IEEE802.11-16/0050r1, Fragmentation for MU frames—Follow up on acks

SUMMARY OF INVENTION

Even though the "Dedicated" C-BA frame can acknowledge multiple fragments of an MSDU or MMPDU carried in an A-MPDU, many of the bits in the BA Bitmap of the "Dedicated" C-BA frame are left unused when only a few of the MPDUs of the A-MPDU carry fragmented MSDUs.

One non-limiting and exemplary embodiment of the present disclosure facilitates providing an apparatus and a method that can improve the efficiency of the BlockAck frame.

In one general aspect, the techniques disclosed here feature: a communication method comprising: receiving a plurality of frames from a transmitting device, wherein the payload of a frame may consist of either fragmented or unfragmented packet; recording the receive status of the frames; generating a BlockAck frame that contains at least one Bitmap field used to indicate the receive status of the frames, wherein the number of bits allocated in the Bitmap field for a packet is variable; and transmitting the BlockAck frame.

These general and specific aspects may be implemented using a device, a system, a method, and a computer program, and any combination of devices, systems, methods, and computer programs.

The apparatus and method described in the present disclosure improve the efficiency of the BlockAck frame.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1 is a diagram of a particular embodiment of a system that makes use of the efficient Block Acknowledgement.

FIG. 2 is a diagram of an example frame exchange sequence involving Setup and Teardown of Block Ack mechanism.

FIG. 3 is a diagram of an Uplink Multi-User frame exchange sequence high-lighting the usage of fragmentation in 802.11ax.

FIG. 4 is a diagram of the frame structure of the "Dedicated" C-BA frame introduced in 802.11ax.

FIG. 5 is a diagram of Downlink Multi-User frame exchange sequence high-lighting the technical problem addressed by the present disclosure.

FIG. 6A is a diagram of the structure of the Sequence Control field as per the first embodiment.

FIG. 6B is a diagram of the structure of the BA Information field as per the first embodiment.

FIG. 6C is a diagram of the encoding table for the encoding of the Number of Fragments field.

FIG. 7A is a diagram of the Fragment Size Table maintained by the recipient station as per the first embodiment.

FIG. 7B is a diagram of the Scoreboard Bitmap used to record the receive status of MPDUs as per the first embodiment.

FIG. 7C is a diagram of an example BA Bitmap as per the first embodiment.

FIG. 8A is a diagram of the transmission window maintained by the transmitting station as per the first embodiment.

FIG. 8B is a diagram of the Fragment Size Table maintained by the transmitting station as per the first embodiment.

FIG. 8C is a diagram of an example BA Bitmap as per the first embodiment illustrating the scenario of when an entire MSDU is not received.

FIG. 9A is a center portion of a diagram of an example frame exchange sequence that highlights the Block Acknowledgement mechanism as per the first embodiment.

FIG. 9B is a left-hand portion of a diagram of an example frame exchange sequence that highlights the Block Acknowledgement mechanism as per the first embodiment.

FIG. 9C is a right-hand portion of a diagram of an example frame exchange sequence that highlights the Block Acknowledgement mechanism as per the first embodiment.

FIG. 10A is a center portion of a diagram of an example frame exchange sequence that highlights the Block Acknowledgement mechanism as per the second embodiment.

FIG. 10B is a left-hand portion of a diagram of an example frame exchange sequence that highlights the Block Acknowledgement mechanism as per the second embodiment.

FIG. 10C is a right-hand portion of a diagram of an example frame exchange sequence that highlights the Block Acknowledgement mechanism as per the second embodiment.

FIG. 11A is a diagram of the Add Block Acknowledgment (ADDBA) Extension element per the third embodiment.

FIG. 11B is a diagram of the ADDBA capabilities field.

FIG. 11C is a diagram of the encoding table of the Maximum Fragments per MSDU field.

FIG. 11D is a diagram of the Scoreboard Bitmap used to record the receive status of MPDUs per the third embodiment.

FIG. 11E is a diagram of the Scoreboard Bitmap encoding scheme as per the third embodiment.

FIG. 12A is a diagram of an example frame exchange sequence that highlights the Block Acknowledgement mechanism as per the third embodiment.

FIG. 12B is a center portion of a diagram of an example frame exchange sequence that highlights the Block Acknowledgement mechanism as per the third embodiment.

FIG. 12C is a left-hand portion of a diagram of an example frame exchange sequence that highlights the Block Acknowledgement mechanism as per the third embodiment.

FIG. 13A is a diagram of the structure of the HE Variant HT Control field used to carry the Number of fragments field as per the fourth embodiment.

FIG. 13B is another diagram of the structure of the HE Variant HT Control field used to carry the Number of fragments field as per the fourth embodiment.

FIG. 14A is a diagram of an example of the BA Bitmap encoding used as per the fifth embodiment.

FIG. 14B is a diagram of another example of the BA Bitmap encoding used as per the fifth embodiment.

FIG. 14C is a diagram of another example of the BA Bitmap encoding used as per the fifth embodiment.

FIG. 15A is a diagram of the Scoreboard Bitmap used to record the receive status of MPDUs as per the fifth embodiment.

FIG. 15B is a diagram of the BA Bitmap used to record the receive status of MPDUs as per the fifth embodiment.

FIG. 16A is a center portion of a diagram of an example frame exchange sequence that highlights the Block Acknowledgement mechanism as per the fifth embodiment.

FIG. 16B is a left-hand portion of a diagram of an example frame exchange sequence that highlights the Block Acknowledgement mechanism as per the fifth embodiment.

FIG. 17 is a flowchart of the operations carried out by the Originator in order to accomplish the efficient Block Acknowledgment mechanism introduced in the present disclosure.

FIG. 18 is a flowchart of the operations carried out by the Recipient in order to accomplish the efficient Block Acknowledgment mechanism introduced in the present disclosure.

FIG. 19A is a block diagram of an example Originator.

FIG. 19B is a detailed block diagram of an example Originator.

FIG. 20 is a block diagram of a Transmission module of the Originator.

FIG. 21A is a block diagram of an example Recipient.

FIG. 21B is a detailed block diagram of an example Recipient.

FIG. 22 is a block diagram of a Reception module of the Recipient.

DESCRIPTION OF EMBODIMENTS

Figure 12D:
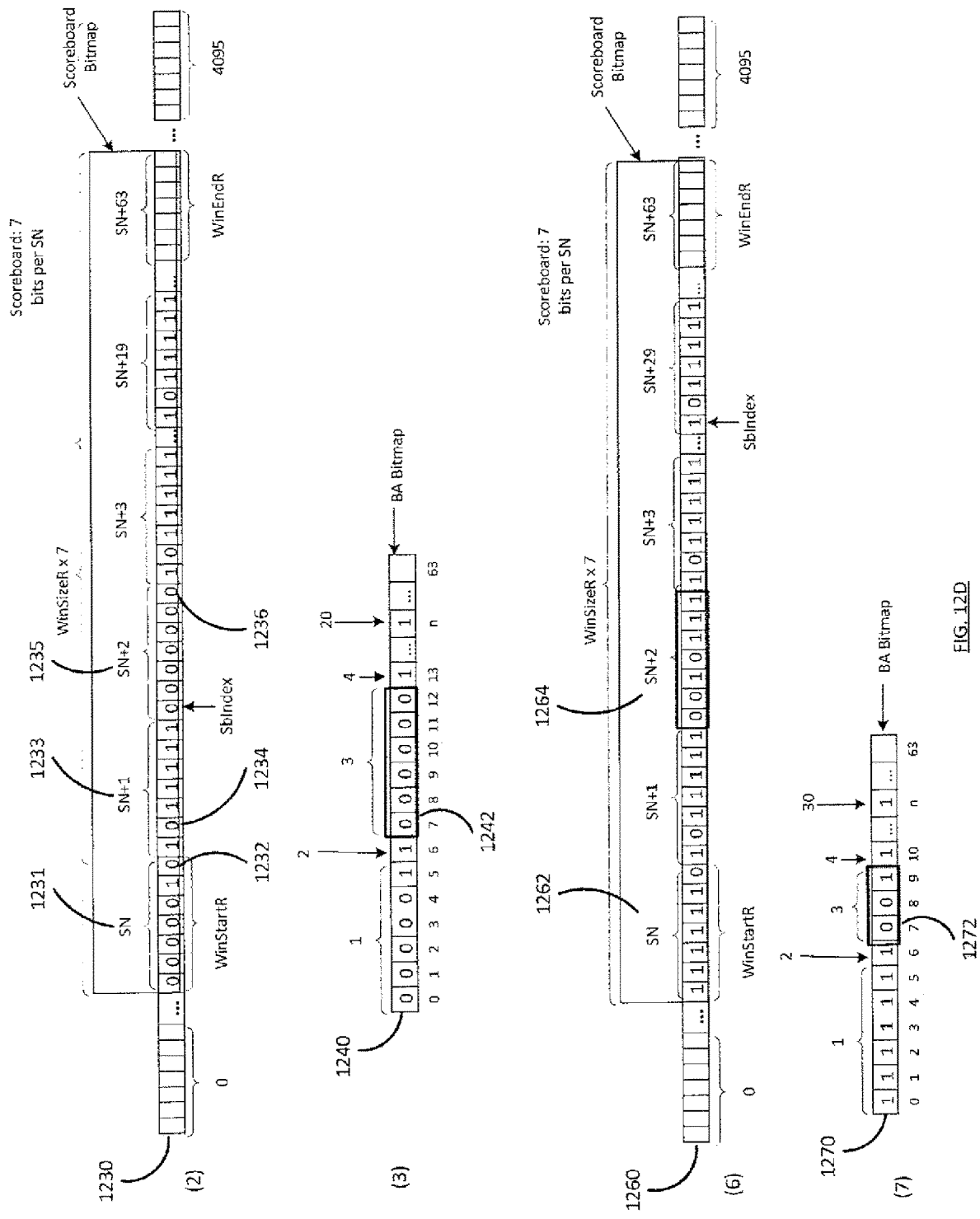
FIG. 12D is a right-hand portion of a diagram of an example frame exchange sequence that highlights the Block Acknowledgement mechanism as per the third embodiment.

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

The Block Acknowledgment mechanism was introduced in the 802.11e amendment. It allows the transfer of a block of frames that are acknowledged with a single Block Acknowledgment (Block Ack or BA) frame instead of a group of ACK frames, each of which indicates ACK/NACK of an individual data frame. There are various kinds of BlockAck frame. The original BlockAck frame is known as the Basic BlockAck variant, containing a 1024-bit BA bitmap and can acknowledge 64 MSDUs, each of which can be fragmented with up to 16 fragments. At higher data rates, however, fragmentation does not provide much benefit and 802.11n made the Basic BlockAck obsolete and introduced the compressed BlockAck variant. The compressed BlockAck variant does away with the 16 bits per MSDU for fragmentation, resulting in a 64-bit BA bitmap. Due to this, 802.11n and 802.11ac do not allow MPDUs carrying fragmented MSDUs or MMPDUs to be carried in an Aggregate MAC Protocol Data Unit (A-MPDU).

As for fragmentation, 802.11ax Working Group has introduced the following four types (levels) of fragmentation in order to cater to various device capabilities.

Level 0: No support for fragments
Level 1: Support for a fragment in a "VHT" single MPDU only
Level 2: Support for up to one fragment per MSDU in an A-MPDU
Level 3: Support for multiple fragments of an MSDU per A-MPDU Conventional BlockAck mechanism can support Level 0, Level 1 and Level 2 fragmentations but cannot support Level 3 fragmentation. Compressed Block Acknowledgement (C-BA) variant also called as "Dedicated" C-BA frame has been introduced in 802.11ax to support the above mentioned Level 3 fragmentation.

FIG. 2 shows an example sequence 200 of frame exchange between two 802.11 devices, which involves the exchange of management frames for the purpose of setting up and tearing down an HT-immediate Block Ack agreement. In an infrastructure Basic Service Set (BSS), one of the 802.11 devices will be an AP and the other one will be an STA. The sequence 200 consists of three distinct phases: (a) a Block Ack Setup phase 210, (b) one or more data exchange phases 220 and (c) a Block Ack Teardown phase 230. In the context of Block Ack protocol, the 802.11 device that initiates the burst transmission shown in 220 is known as the Originator while the recipient 802.11 device that receives the burst transmission and prepares the Block Ack frame is known as the Recipient. In the rest of the disclosure, the terms Originator and Recipient are specifically used in the context of the Block Ack protocol. Each individual Block Ack agreement will have one wireless device acting as an Originator and another wireless device acting as a Recipient. Both AP as well as STAs can act as either Originator or Recipient.

Furthermore, a wireless device may act as an Originator for one Block Ack agreement and at the same time, the device may also act as a Recipient for a different Block Ack agreement. Before the Block Ack mechanism can be used, both the Originator and the Recipient need to prepare additional resources. The Recipient not only needs to allocate additional buffers to receive the burst of frames, but it also needs to maintain a scoreboard to record the reception status of each frame. Similarly, the Originator also needs to maintain a record of the transmitted frames. This preparation is done in the Block Ack Setup phase 210. In this phase, the two 802.11 devices can negotiate the buffer size, the Traffic Identifier (TID) of the frames involved, the duration for which the negotiation will be in effect etc. Once the data exchange phase 220 is completed, either party may tear down the Block Ack agreement in the Teardown phase 230. Since Level 3 fragmentation requires additional resources, during the setup and the teardown phases of a Block Ack agreement involving Level 3 fragmentation, the Legacy Block Ack Action frames (Add Block Acknowledgment (ADDBA) Request, ADDBA Response and Delete Block Acknowledgment (DELBA) may be customized to indicate that the Block Ack agreement involves Level 3 fragmentation, or new Block Ack Action frames may be defined to request, respond and delete the Block Ack agreement that involves Level 3 fragmentation. A one-octet field called the Block Ack action field is used to differentiate the various types of Block Ack Action frame. Block Ack Action field values 0, 1 and 2 are used to indicate ADDBA Request, ADDBA Response and DELBA, respectively. In order to differentiate from the legacy Block Ack Action frames, Block Ack Action field values of 3, 4 and 5 may be used to define new Block Ack Action frames for Level 3 ADDBA Request, ADDBA Response and DELBA respectively.

FIG. 3 illustrates an Uplink Multi-User frame exchange sequence 300. An uplink Multi-User frame exchange is initiated by the AP by transmitting a newly defined control frame called a Trigger frame. The Trigger frame 310 contains information on Resource Unit (RU) Allocation, the duration allocation (PPDU length), the MCS etc. to be used for the UL transmission. Upon receiving the Trigger frame 310, the STAs that are allocated RUs by the Trigger frame 310 can send back respective UL frames in the UL multi-user PPDU 320. 802.11ax mandates that all the STAs that participate in the UL multi-user transmission must start the respective transmission at the same time and also end the transmission at the same time. Since it is unlikely that an STA will always have an exact integer number of MSDUs to fill the available duration allocation (PPDU length), it has been agreed in 802.11ax that instead of applying padding to any unused duration allocation, a fragment of an MSDU may be transmitted such that its transmission ends at the time stipulated by the Trigger frame 310. In the UL multi-user PPDU 320, STA2 happens to have the required number of integer MSDUs ready for transmission and exactly matching the duration allocation. However STA1 and STA3 need to apply fragmentation in order to meet the duration allocation (PPDU length) and transmits the MSDU fragments 322 and 324 respectively as the last frames of their respective UL PPDUs. The AP concludes the frame exchange by transmitting respective Block Acks in the DL MU PPDU 330.

FIG. 4 illustrates the structure of the "Dedicated" C-BA frame 400 that has been introduced in 802.11ax to acknowledge multiple fragments of an MSDU per A-MPDU. The "Dedicated" C-BA frame 400 shares the same structure as that of other BlockAck frames and is made up of a Frame Control field 410, a Duration field 420, a Receiver Address (RA) field 430, a Transmitter Address (TA) field 440, a BA Control field 450, a BA Information field 460 and a Frame Check Sequence (FCS) field 490. The BA Information field 460 is further comprised of a BA Starting Sequence Control field 470 and a BA Bitmap field 480. The BA Starting Sequence Control field 470 is divided into a Fragment Number subfield 472 and a Starting Sequence Number (SSN) subfield 474. The "Dedicated" C-BA frame differs from other Block Ack frames in that, instead of setting the Fragment Number subfield 472 to 0, the Fragment Number subfield 472 is set to a non-zero value X (X is an integer larger than one) that indicates the maximum number of fragments per MSDU that can be acknowledged by the "Dedicated" C-BA frame.

In addition, the BA Bitmap field 480 is divided into 64/X blocks such that each bit in the BA Bitmap 480 acknowledges the successful reception of a single MSDU or the fragments of an MSDU, with the first X bits of the BA Bitmap corresponding to the MSDU with Sequence Number (SN) matching the value of the Starting Sequence Number (SSN) subfield 474. For unused fragment numbers of an MSDU, the corresponding bits in the BA Bitmap 480 are set to 0 by default. In 802.11ax, the value of X has been agreed as 4, which mean that the "Dedicated" C-BA frame 400 can only acknowledge a maximum of 16 MSDUs. In addition, since the BA Bitmap 480 is statically divided into 16 blocks of 4 bits each, it is possible that in the absence of many fragmented MSDUs, many of the BA Bitmap bits will be left unused. In the worst case scenario, assuming that only one MSDU is fragmented, only one block will have multiple bits used to acknowledge the MSDU fragments while only the first bit is used in the rest of the blocks leading to 45 bits, representing around 70% of the available BA Bitmap bits, being unused.

FIG. 5 illustrates an example Downlink Multi-User frame exchange 500 to highlight the possible issues mentioned above. The AP initiates the frame exchange by transmitting the DL MU PPDU 510 carrying A-MPDUs for STA1, STA2 and STA3 in the respectively allocated RUs. In order to meet the duration allocation (PPDU length), the AP fragments the last MSDU in each of the three A-MPDUs. Since each A-MPDU only carries a single MSDU fragment, this is considered a Level 2 fragmentation and the STAs acknowledge the successful reception of the frames by respectively transmitting Compressed Block Ack in the UL MU PPDU 520. The AP continues the frame exchange by transmitting the second DL MU PPDU 530 carrying A-MPDUs 532, 534 and 536 addressed to STA1, STA2 and STA3 respectively. Due to the relatively large sizes of the fragments, A-MPDU 532 only carries 4 MPDUs, 3 of which are the last 3 fragments of MSDU #3 while the last MPDU carries the first fragment of MSDU #4. As for A-MPDU 534, due to the relatively smaller sized MSDUs, 18 MPDUs can be accommodated. In fact, in this case the number of MPDUs that can be carried in A-MPDU 534 is limited to 18 not due to the lack of duration allocation but rather due to the fact that the "Dedicated" C-BA frame can only acknowledge 16 consecutive MSDUs. As such, despite using fragmentation, A-MPDU 534 requires padding 537 to align with the PPDU end time. As for A-MPDU 536 only 3 MPDUs can be accommodated due to the fact that the remaining duration is smaller than the minimum size allowed for fragments and hence padding 538 has to be applied. Finally the frame sequence is concluded by the STAs respectively transmitting a corresponding "Dedicated" C-BA frame in the UL MU PPDU 540.

Based on the above knowledge, the inventors of this application have reached the present disclosure. Methods of this disclosure provide a more efficient Block Ack mechanism to acknowledge A-MPDUs made up of MPDUs carrying fragmented MSDUs. As per the disclosed methods, the BA Bitmap of a Block Ack is able to record the receive status of received MPDUs in a much more efficient manner. As a result, a Recipient device is able to acknowledge several fold more MSDUs with a given BA Bitmap size as compared to the prior art. Consequently, the Originator device is able to pack more MSDUs in a single A-MPDU due to the expanded Sequence Number space.

The various embodiments for the efficient Block Ack mechanism proposed in the present disclosure are described in detail in the following sections.

First Embodiment

As mentioned earlier, 802.11ax has agreed to allow the aggregation of fragmented MSDUs in an A-MPDU. However, support for fragmentation requires devices to have additional capabilities. Since 802.11ax is expected to support devices with diverse set of capabilities, some devices may have the required capabilities while others may not. In order to cater to various device capabilities, 802.11ax has introduced the following four fragmentation types (levels):

Level 0: No support for fragments. Originator may not aggregate fragmented MSDUs.

Level 1: Support for a fragment in a "VHT" single MPDU only. Originator may aggregate at most one fragment of an MSDU in a "VHT" single MPDU and the Recipient responds with an Ack.

Level 2: Support for up to one fragment per MSDU in an A-MPDU. Originator may aggregate up to one fragment per MSDU in an A-MPDU and the Recipient responds with an Ack (if "VHT" single MPDU) else with a Compressed BA (C-BA).

Level 3: Support for multiple fragments of an MSDU per A-MPDU. Originator may aggregate multiple fragments per MSDU in an A-MPDU and the Recipient responds with an Ack (if "VHT" single MPDU), or with a C-BA (if A-MPDU with up to one fragment per MSDU), if else with a "Dedicated" C-BA.

It has been further agreed in 802.11ax that the maximum number of fragments per MSDU that can be acknowledged by the "Dedicated" C-BA frame is 4 and consequentially the number of fragments of an MSDU per A-MPDU in Level 3 fragmentation is equal to 4. In the legacy fragmentation mechanism, an MSDU may be divided into a maximum of 16 fragments. As a result, a 4-bit Fragment Number field within the Sequence Control field in the MAC header is used to keep track of the MPDUs carrying the fragmented MSDUs. However, since the number of fragments of an MSDU per A-MPDU in Level 3 fragmentation is limited to 4, it makes sense that when operating in Level 3 fragmentation mode, an MSDU may be divided into a maximum of 4 fragments. Since 2 bits are enough to track 4 fragments of an MSDU, the remaining 2 bits of the Fragment Number field can be used for other purpose.

FIG. 6A illustrates the structure of the Sequence Control field 600 as per the first embodiment. While the Sequence Number field 606 remains unchanged, only 2 bits are used for the Fragment Number field 604 and the remaining 2 bits are used for the Number of Fragments field 602, which is used to indicate the number of fragments into which the MSDU matching the Sequence Number 606 is divided. The encoding table 640 in FIG. 6C lists the encoding of the Number of Fragments field 602. The 2 bits of the Number of Fragments field 602 in FIG. 6A can indicate up to 4 fragments. The value of the Number of Fragments field 602 remains constant in all the fragments of the MSDU matching the Sequence Number 606. Since each MPDU carries the Sequence Control field 600 in respective MAC header, by inspecting the Number of Fragments field 602, a recipient of the MPDU can quickly find out the number of fragments that the MSDU matching the Sequence Number 606 is divided into, without having to track the More Fragments bit in the Frame Control field.

FIG. 6B illustrates the structure of the BA Information field 610 of a Block Ack frame as proposed by the first embodiment. The structure of the BA Starting Sequence Control field 620 remains unchanged and is made up of a 4-bit Fragment Number field 622 and a 12-bit Starting Sequence Number (SSN) field 624. In the legacy Block Ack frames, the Fragment Number field is always set to 0. However, the Fragment Number field 622 may be used to differentiate the type or usage of the BA Bitmap field 630. For example, some of the bits of the Fragment Number field 622 may be used to indicate a different encoding scheme for the BA Bitmap field 630 as compared to legacy Block Ack, while some other bits may be used to indicate the size of the BA Bitmap field 630.

Even though FIG. 6B illustrates an 8 octet long BA Bitmap as an example, the methods disclosed in the present disclosure applies equally well to a smaller or a longer BA Bitmap. The Starting Sequence Number (SSN) field 624 indicates the Sequence Number (SN) of the MSDU that is acknowledged by the first bit or blocks of bits of the BA Bitmap field 630. In the legacy Compressed Block Ack, each bit of the BA Bitmap is used to acknowledge one MSDU. In the "Dedicated" C-BA frame, the BA Bitmap field 630 is statically divided into 16 blocks of 4 bits each. Each bit in the BA Bitmap is used to acknowledge successful reception of a single MSDU or fragments of an MSDU, with the first 4 bits of the BA Bitmap field 630 corresponding to the MSDU with Sequence Number (SN) matching the value of the Starting Sequence Number (SSN) subfield 624. Instead of a static division of the BA Bitmap field 630 into blocks of 4 bits, the first embodiment proposes a dynamic encoding of the BA Bitmap field 630, such that block of bits are assigned only as needed. A block of bits are allocated to an MSDU, equal to the number of fragments of the MSDU carried in the received A-MPDU. The Recipient may use the value of the Number of Fragments field 602 in the received MPDUs to figure out the bits allocations in the BA Bitmap field 630. For example, a block 632 of 3 bits is allocated for an MSDU with 3 fragments; a block 634 of 2 bits is allocated for an MSDU with 2 fragments; a single bit 636 is allocated for an unfragmented MSDU while a block 638 of 4 bits is allocated for an MSDU with 4 fragments.

One challenge associated with such dynamic encoding of the BA Bitmap is to maintain the information regarding the bits block size. FIG. 7A illustrates a Fragment Size Table (FST) 700 that is used by the Recipient to record the number of bits allocated to the received MSDUs based on the number of fragments per MSDU. Assuming a 64-bit BA Bitmap, the FST 700 can be implemented as a circular array with 64 entries. In general if the size of the BA Bitmap is denoted as BitmapLen, the FST 700 can be implemented as a circular array with BitmapLen entries, Variables FstStartR and FstEndR are used to tract the start and end position of the FST respectively, while FstIndexR is used to track the entry corresponding to the MSDU that is currently being processed.

FIG. 7B illustrates a bitmap used to record the receive status of the received MSDUs. 710 represent the entire sequence number space, with 4 bits per sequence number. The Scoreboard bitmap 712 is a part of the Block Acknowledgement record that is initialized during the setup phase 210 of an HT-immediate Block Ack agreement between the Originator and the Recipient and represents the sequence number space of the current transmission window. Variable WinStartR represents the block of bits corresponding to the lowest sequence number position in the bitmap; variable WinSizeR is set to a smaller one of the value of BitmapLen (the size of the BA Bitmap) and the value of the Buffer Size field of the associated ADDBA Response frame that established the Block Ack agreement (64 in this example); and variable WinEndR represents the block of bits corresponding to the highest sequence number in the current transmission window. The size of the scoreboard bitmap is equal to WinSizeR*4. A variable SbIndex is used to track the exact bit corresponding to a received MPDU. For each HT-immediate Block Ack agreement that involves Level 3 fragmentation, the Recipient may choose either full-state or partial-state operation. Under full-state operation, the Scoreboard bitmap 712 is maintained in statically assigned memory, while in partial-state operation, the Scoreboard bitmap 712 is maintained in a cache memory. All operations on FstStartR, FstEndR and FstIndexR are performed circular modulo WinSizeR.

<Scoreboard Contexts>

Definitions

SN is the value of the Sequence Number field 606 of the received frame.
FN is the value of the Fragment Number field 604 of the received frame.
NF is the value of the Number of Fragments field 602 of the received frame.
SSN is the value of the Starting Sequence Number field 624 of the received BlockAckReq frame.
BitmapLen is the bit length of the BA Bitmap field 630.
<Scoreboard Context During Full-State Operation>
For each HT-immediate Block Ack agreement that involves Level 3 fragmentation and that uses full-state operation, a Recipient maintains a Block Acknowledgment record which includes a static Scoreboard bitmap of size WinSizeR*4 and a static Fragment Size Table (FST) with WinSizeR entries. A STA implementing an HT-immediate Block Ack agreement that uses full-state operation shall maintain the Block Acknowledgment record for that agreement according to the following rules:
a) Initialization (at HT-immediate Block Ack agreement establishment):
1) Set WinStartR=SSN from the ADDBA request frame that initiated the HT-immediate Block Ack agreement that involves Level 3 fragmentation.
2) Set WinSizeR=smaller of BitmapLen and the value of the Buffer Size field of the associated ADDBA Response frame.
3) Set WinEndR=WinStartR+WinSizeR−1.
4) Set FstStartR=0.
5) Set FstEndR=FstStartR+WinSizeR−1.
6) FST initialized to all "4".
b) For each received Data frame related to a specific full-state operation Block Ack agreement:
1) If WinStartR<=SN<=WinEndR,
  i) Set SbIndex=SN*4+FN.
  ii) Set to 1 the bit at position SbIndex in the scoreboard bitmap.
  iii) Set FstIndexR=FstStartR+SN−WinStartR.
  iv) Set to NF the entry at position FstIndexR in the FST.
2) If WinEndR<SN<WinStartR+$2^{11}$
  i) If (SN−WinEndR)>WinSizeR, set the entire scoreboard bitmap to 0, else, set to 0 the bits of the scoreboard bitmap corresponding to SbIndex from (WinEndR+1)*4 to (SN*4+ 3).
  ii) If (SN−WinEndR)>=WinSizeR, set to 4 all the entries of FST, else, set to 4 the entries of FST corresponding to FstIndexR from FstEndR to (FstEndR+SN−WinEndR).
  iii) Set FstEndR=FstEndR+SN−WinEndR.
  iv) Set FstStartR=FstEndR−WinSizeR+1.
  v) Set WinStartR=SN−WinSizeR+1.
  vi) Set WinEndR=SN.
  vii) Set SbIndex=SN*4+FN.
  viii) Set to 1 the bit at position SbIndex in the scoreboard bitmap.
  ix) Set FstIndexR=FstStartR+SN−WinStartR.
  x) Set to NF the entry at position FstIndexR in the FST.
3) If WinStartR+211<=SN<WinStartR, make no changes to the record.
c) For each received BlockAckReq frame related to a specific full-state operation Block Ack agreement:
1) If WinStartR<SSN<=WinEndR,
  i) Set FstStartR=FstStartR+SSN−WinStartR.
  ii) Set WinStartR=SSN.

iii) Set to 0 the bits of the scoreboard bitmap corresponding to SbIndex from (WinEndR+1)*4 to ((WinStartR+WinSizeR−1)*4+3).
iv) Set WinEndR=WinStartR+WinSizeR−1.
v) Set FstEndR=FstStartR+WinSizeR−1.
2) If WinEndR<SSN<WinStartR+211,
i) Set WinStartR=SSN.
ii) Set WinEndR=WinStartR+WinSizeR−1.
iii) Set to 0 the bits of the scoreboard bitmap corresponding to SbIndex from (WinStartR)*4 to (WinEndR*4+3).
iv) Set to 4 the entries of FST corresponding to FstIndexR from FstStartR to FstEndR.
3) If WinStartR+211<=SSN<WinStartR, make no changes to the record.

<Scoreboard Context During Partial-State Operation>

For each HT-immediate Block Ack agreement that involves Level 3 fragmentation and uses partial-state operation, a recipient maintains a Block Acknowledgment record which includes a temporary scoreboard bitmap of size WinSizeR*4 and a temporary Fragment Size Table (FST) with WinSizeR. A STA implementing an HT-immediate Block Ack agreement that uses partial-state operation shall maintain the Block Acknowledgment record for that agreement according to the following rules:

a) Initialization:
1) Set WinSizeR=smaller of BitmapLen and the value of the Buffer Size field of the associated ADDBA Response frame.
2) Set FstStartR=0.
3) Set FstEndR=FstStartR+WinSizeR−1.

b) For each received Data frame related to a specific partial-state Block Ack agreement, when no temporary record for the agreement related with the received Data frame exist:
1) Set WinEndR=SN.
2) Set WinStartR=WinEndR−WinSizeR+1
3) Create a scoreboard bitmap of size WinSizeR*4, with the first four bits in the bitmap corresponding to the sequence number WinStartR and the last four bits in the bitmap corresponding sequence number WinEndR and set all bits in the bitmap to 0.
4) Create a FST with WinSizeR entries and set all entries to "4".

c) For each received Data frame related to a specific partial-state Block Ack agreement, when a temporary record for the agreement related with the received Data frame already exist, the temporary Block Acknowledgment record for that agreement is modified in the same manner as the acknowledgment record for a full-state agreement as described in the earlier section.

d) For each received BlockAckReq frame related to a specific partial-state Block Ack agreement, when no temporary record for the agreement related with the received Data frame exist:
1) Set WinStartR=SSN.
2) Set WinEndR=WinStartR+WinSizeR−1
3) Create a scoreboard bitmap of size WinSizeR*4, with the first four bits in the bitmap corresponding to the sequence number WinStartR and the last four bits in the bitmap corresponding sequence number WinEndR and set all bits in the bitmap to 0.
4) Create a FST with WinSizeR entries and set all entries to "4".

e) For each received BlockAckReq frame related to a specific partial-state Block Ack agreement, when temporary record for the agreement related with the received Data frame already exist, the temporary Block Acknowledgment record for that agreement is modified in the same manner as the acknowledgment record for a full-state agreement as described in the earlier section.

FIG. 7C is a diagram of the BA Bitmap 720 as per the first embodiment. The size or the number of bits in the BA Bitmap 720, BitmapLen, depends on the BlockAck frame type. For example, for legacy Compressed BlockAck frame, Multi-TID BlockAck frame, GCR BlockAck frame, BitmapLen is equal to 64. However, 802.11ax may define new BlockAck frames with shorter or longer, or even variable length BA Bitmap. FIG. 7c illustrates an example BA Bitmap when WinSizeR is equal to BitmapLen. Upon receiving an implicit Block Ack request (a received A-MPDU with Ack Policy equal to Normal Ack) or a BlockAckReq frame, the BA Bitmap is generated based on the content of the relevant section of the Scoreboard Bitmap. Only the bits in the Scoreboard Bitmap that correspond to the received MSDUs and their fragments, if any, are copied over to the BA Bitmap. Since the number of fragments may vary from MSDU to MSDU, the number of bits per MSDU in the BA Bitmap can vary from 1 (no fragments) to 4 (4 fragments). Starting from WinStartR in the Scoreboard Bitmap and the first bit in the BA Bitmap, by referencing the corresponding entry in the Fragment Size Table (FST), the numbers of bits as indicated by the FST entry are copied over to the BA Bitmap.

For example if the FST entry corresponding to WinStartR indicates that the MSDU with Sequence number equal to WinStartR has 4 fragments, the first 4 bits from the scoreboard entry corresponding to WinStartR are copied over to the first 4 bits in the BA Bitmap. If the next FST entry corresponding to WinStartR+1 indicates that the MSDU with Sequence number equal to WinStartR+1 is unfragmented, only the first 1 bit from the scoreboard entry corresponding to WinStartR+1 is copied over to the next bit in the BA Bitmap. Similarly if the MSDU with Sequence number equal to WinStartR+2 has 3 fragments, only the first 3 bits from the scoreboard entry corresponding to WinStartR+2 are copied over to the next 3 bits in the BA Bitmap. This process continues until either the end of the BA Bitmap is reached or all relevant bits of the scoreboard bitmap, including those corresponding to WinEndR, have been copied to the BA Bitmap.

In the event that upon nearing the end of the BA Bitmap, it is discovered that there are not enough bits left in the BA Bitmap to copy over the bits of the next MSDU in the Scoreboard bitmap in its entirety, the remaining bits in the BA Bitmap are all set to 0. As an example, if the next MSDU to be copied in the ScoreBoard bitmap has three fragments, but only two bits are left at the end of the BA Bitmap, the two bits are both set to 0 (e.g. 722). Any MSDU in the valid Sequence number range (WinStartR to WinEndR) that is not received will have the corresponding FST entry equal to 4 by default and the four corresponding bits in the scoreboard bitmap all set to 0.

As such any MSDU in the valid Sequence number range (WinStartR to WinEndR) that is not received will result in four consecutive zeros in the BA Bitmap. If all four consecutive zeros in the BA Bitmap corresponding to an MSDU are zero, it has a special meaning to the Originator and alerts the Originator that none of the MPDUs of that MSDU were received. Since some of the MSDUs that were not received may have less than 4 fragments per MSDU, such MSDUs will result in extra bits in the BA Bitmap. As a consequence, some of the valid bits towards the end of the Scoreboard Bitmap may not be able to fit in the current BA Bitmap. However, when many MSDUs are unfragmented, or even when many MSDUs are fragmented but contain less than 4 fragments each, it can be easily seen that for a BA Bitmap of same size, the Block Ack mechanism proposed by the current disclosure is able to acknowledge many more MSDUs compared to what is possible with the "Dedicated" BlockAck. Even in worst case scenario when all MSDUs are fragmented into 4 fragments each, the efficiency is equal to that of the "Dedicated" BlockAck.

FIG. 8A illustrates a transmission window 800 that may be maintained by an Originator to keep track of the number of MPDUs that may be transmitted in a single A-MPDU. Since level-3 fragmentation allows multiple fragments of an MSDU (up to 4) to be transmitted in a single A-MPDU, and the number of fragments per MSDU may vary from MSDU to MSDU. And the valid Sequence Number space, i.e. the number of unique Sequence Numbers that may be transmitted within one transmission window is not fixed. Variable WinStartO tracks the Sequence Number of the first MSDU in the current transmission window while the maximum number of MPDUs that may be transmitted within a transmission window is indicated by the variable WinSizeO, which is lesser than the value of the Buffer Size field of the associated ADDBA Response frame that established the Block Ack agreement and is not greater than the number of bits in the BA Bitmap of the associated BlockAck frame. The purpose of maintaining the transmission window 800 is to ensure that the Recipient is able to keep record of the receive status of all the received MDPUs.

FIG. 8B illustrates a Fragment Size Table (FST) 810 that may be maintained by an Originator to keep track of the number of fragments present in the MSDUs being transmitted in the current transmission window. Even though the originator can read the number of fragments of each of its MSDUs in the transmission buffer, for ease of access, the originator may also maintain a FST. One FST is associated with every new HT-immediate Block Ack agreement that involves a level-3 fragmentation. Assuming that the Block-Ack frame related to the HT-immediate Block Ack agreement has a 64-bit BA Bitmap, the FST can be implemented as an up to 64 entries table that records the number of fragments of up to 64 MSDUs. FST may be implemented as an up to 64 entries cyclic buffer with FstStartO and FstEndO tracking the start and the end of the FST while FstIndexO is used to as an index to individual entries of the FST.

In general if the size of the BA Bitmap is denoted as BitmapLen, the FST can be implemented as a table with entries equal to BitmapLen. The entry of FST at position FstStartO corresponds to the sequence number of the first MSDU in the current transmission window i.e. the MSDU with Sequence Number subfield value equal to WinStartO while the entry of FST at position FstEndO corresponds to the sequence number of the last MSDU in the current transmission window. Each entry of the FST records the number of fragments per respective. Due to the presence of fragments, the number of unique Sequence Numbers that may be transmitted within one transmission window is not fixed, but since WinSizeO represents the maximum unique Sequence Numbers that may be transmitted within one transmission window, all operations on FstStartO, FstEndO and FstIndexO are performed circular modulo WinSizeO.

FIG. 8C is a diagram of an example BA Bitmap field as per the first embodiment illustrating the scenario of when an entire MSDU is not received. Since the number of acknowledgment bits per Sequence Number is not fixed in the BA Bitmap, the Originator needs to refer to the corresponding FST entry in FST 810 to correctly decode the acknowledgment bits. If the Recipient correctly receives at least one fragment of each MSDU, based on the Number of Fragments field 602 in the MPDU header, the Recipient will know the correct number of bits to assign for each MSDU in the BA Bitmap. In such cases, the BA Bitmap will have a one to one relationship with the MPDUs in the transmission window and the Originator can correctly decode the acknowledgment status.

However in cases where the Recipient did not receive even a single fragment of a MSDU or the un-fragmented MSDU, four consecutive bits in the BA Bitmap corresponding to the missing Sequence Number will be set to 0. As an example, if the MPDU with Sequence Number SN+1 is not received by the Recipient, instead of just one bit set to 1 if the MSDU was received correctly, there will be four consecutive bits set to 0 in the BA Bitmap corresponding to SN+1 as highlighted by the black box 824. As per the FST entry 812, the Originator would be expecting a single bit for the MPDU with Sequence Number SN+1. If the bit is set to zero, the Originator needs to check the next three bits. If it receives four consecutive zeros at a Sequence Number boundary, the Originator will interpret it as a failure by the Recipient to receive any MPDUs with Sequence Number SN+1 and it will mark the transmission status of all MPDUs corresponding to SN+1, in this case one MPDU, as failed and move forward four bits in the BA Bitmap.

Only consecutive zeros, equal to the maximum number of fragments per MSDU, that occur at the SN boundaries will have this special meaning. In the above example, since, based on FST, the Originator is aware that the two zeros 822 at bit 2 and bit 3 (first bit is bit 0) corresponds to MSDU SN; even though there are four consecutive zeros starting from bit number 2, the Originator does not confuse this as having a special meaning. Only the four consecutive zeros starting at the SN+1 boundary, i.e. 824, are interpreted as a failure to receive the MSDU with Sequence Number SN+1.

FIGS. 9A, 9B and 9C illustrate an example frame exchange sequence 900 that makes use of the efficient Block Ack mechanism as per the first embodiment. It is assumed that prior to the frame exchange, an HT-immediate Block Ack agreement involving a Level 3 fragmentation has already been negotiated between the two wireless devices involved in the frame exchange. In this example, the value of WinSizeO, WinSizeR and BitmapLen is equal to 64. The Originator and Recipient maintain the Fragment Size Tables 902 and 920 to keep track of the number of fragments present in the MSDUs being transmitted or received in the current transmission window respectively. All the entries of FST are initialized to the maximum number of fragments allowed per MSDU under the current HT-immediate Block Ack agreement, 4 in this example.

The Originator initiates the frame exchange by transmitting A-MPDU 910 that aggregates 34 MPDUs, starting with four MPDUs carrying four respective fragments of the MSDU with SN=1, five MPDUs carrying unfragmented MSDUs with SN 2 to 6, two MPDUs carrying two respective fragments of MSDUs with SN=7 and twenty three MPDUs carrying unfragmented MSDUs with SN 8 to 30. Each MPDU also carries the Number of Fragments field 602 in the respective MAC header.

Upon receiving an MPDU, the Recipient copies the value of the Number of Fragments 602 to the corresponding entry of the FST 920, for example 4 to entry #1 corresponding to the MSDU with SN=1, 1 to entries #2, #3, #4 and #6 etc. Since the value of the Number of Fragments field of all the MPDUs carrying fragments of the same MSDU is the same, the FST entries only need to be updated once per MSDU. In this transmission, the Recipient fails to receive three MPDUs: MPDU 912 with SN=5, MPDUs 914 and 916 carrying two fragments of the MSDU with SN=7. As a result, the FST entries #5 922 and #7 924 as well as all entries corresponding to MSDUs with SN outside the transmission window remain unchanged at the initial value of 4. At the same time, the Recipient also records the receive status of each MPDU in the corresponding bit of the Scoreboard Bitmap 926, setting to 1 each bit corresponding to a correctly received MPDU.

In case of unfragmented MSDUs, only the first bit in the 4-bit block corresponding to the MSDU is set to 1, rest of the bits remain set to 0. In this example, SN=1. The MPDUs of A-MPDU 910 indicates an implicit Block Ack request (Ack Policy equal to Normal Ack). Upon reaching the end of A-MPDU 910, starting from the first bit of the Scoreboard Bitmap 926 and the first bit in the BA Bitmap 930, by referencing the corresponding entry in the Fragment Size Table (FST) 920, the numbers of bits as indicated by the FST entries are copied over to the BA Bitmap 930, one MSDU at a time. The four bits from the scoreboard entry corresponding to the MSDU with SN=1 are copied over to the first four bits in the BA Bitmap, the first one bit of scoreboard entries corresponding to MSDU with SN=2 to 4 are copied over to the next three bits. Similarly since the FST entry #5 922 indicates a value of 4, four bits (0000) from the scoreboard entry corresponding to MSDU with SN=5 are copied over to the next four bits 932 in the BA Bitmap. Similarly, one bit and four bits (0000) from scoreboard entries corresponding to MSDU with SN=6 and 7 are copied over to bit #11 and the next four bits 934 of the BA Bitmap respectively. The rest of the bits within the valid range of the Scoreboard Bitmap 926 are copied over to the respective bits of the BA Bitmap 930 in similar fashion. The bit 928 corresponding to the last MSDU in A-MPDU 910 with SN=30 is copied over to bit #38 936 in the BA Bitmap 930.

The Recipient acknowledges the receipt of the A-MPDU 910 by transmitting a BlockAck frame 938 carrying the BA Bitmap 930. The Starting Sequence Number field 624 of the BlockAck frame 938 is set to the Sequence Number of the first MSDU acknowledged by the BA Bitmap 930, while one bit (e.g. B0) of the Fragment Number field 622 may be used to indicate that the BA Bitmap 930 is encoded as per the first embodiment, and two bits (e.g. B1, B2) may be used to indicate the length (number of bits) of the BA Bitmap 930.

Once the Originator receives the BlockAck frame 938, the Originator starts to decode the BA Bitmap 930 based on the values of the bits of the Fragment Number field 622. Even though the number of bits per MSDU varies in the BA Bitmap 930, the Originator can correctly understand the receive status of each MPDU by referencing the FST 902. When the Originator comes across four consecutive zeros 932 at the SN boundary for the MSDU with SN=5, the Originator will interpret it as a failure by the Recipient to receive any MPDUs corresponding to the MSDU with SN=5 and based on FST entry 904, it will mark the transmission status of the single MPDU corresponding to SN=5 as failed. Similarly, the Originator will interpret the four consecutive zeros 934 at the SN boundary for MSDU with SN=7 as a failure by the Recipient to receive any MPDUs corresponding to the MSDU with SN=7 and based on FST entry 906, it will mark the transmission status of the two MPDUs corresponding to SN=7 as failed.

Based on the contents of the BlockAck 938, the Originator transmits the next A-MPDU 940 that aggregates the three failed MPDUs corresponding to the MSDUs with SN=5 and 7, a single MPDU carrying unfragmented MSDUs with SN 31, three MPDUs carrying three respective fragments of the MSDU with SN=32 and nine MPDUs carrying the unfragmented MSDUs with SN 33 to 40. The entries of FST 902 are updated accordingly. In this transmission, the Recipient fails to receive four MPDUs: MPDU 942 which is the first fragment of the MSDU with SN=7 and MPDUs 944, 946 and 948 carrying the three fragments of the MSDU with SN=32. As a result, the FST entries #32 949 as well as all entries corresponding to MSDUs with SN outside the transmission window remain unchanged at the initial value of 4.

However, since the MPDU carrying the MSDU with SN=5 and also MPDU carrying the second fragment of the MSDU with SN=7 are received correctly, based on the value of the Number of Fragments field 602 in the MPDU header, the Recipient updates the FST entry 922 and 924 to the correct values of 1 and 2 respectively. Upon reaching the end of the A-MPDU 940, the BA Bitmap 950 is created by copying over the relevant bits of the Scoreboard Bitmap as explained earlier. This time, since none of the MPDUs corresponding to MPDU with SN=32 was received, four zeros are copied over to the four corresponding bits 952 in the BA Bitmap 950.

Finally, the Recipient acknowledges the receipt of the A-MPDU 940 by transmitting a BlockAck frame 954 carrying the BA Bitmap 950. Upon receiving the BlockAck frame 954, the Originator proceeds to decode the BA Bitmap 950 as explained earlier. When the Originator comes across four consecutive zeros 952 at the SN boundary for the MSDU with SN=7, the Originator will interpret it as a failure by the Recipient to receive any MPDUs corresponding to the MSDU with SN=32 and based on FST entry 908, it will mark the transmission status of the three MPDUs corresponding to SN=32 as failed. As can be seen from this example, when the number of fragmented MSDUs is less, significant gain in acknowledgment efficiency can be achieved by adopting the Block Acknowledgment mechanism presented in the first embodiment.

Second Embodiment

In the event where many MSDUs are completely not received, the BA Bitmap will be filled with many groups of consecutive zeros thereby reducing the Sequence Number space of MPDUs that may be acknowledged with a single Block Ack frame. As explained earlier, the primary use case for Level 3 fragmentation is to fill any unused space at the end of the uplink Multi-user PPDU. As such even though, Level 3 fragmentation allows up to 4 fragments per MSDU, in many scenarios, especially when the MSDUs are small in size, the actual number of fragments required per MSDU may be less than 4; and in many cases may just be 2.

Based on this observation, the second embodiment improves the mechanism presented in the first embodiment and recommends that in the event where the entire MSDU is not received, the FST entry corresponding to the MSDU is updated as the maximum number of fragments of a same MSDU present in the received A-MPDU, for example 2. This leads to the number of consecutive zeros in the BA Bitmap, used to represent completely not received MSDUs, to 2. In order to help the Originator to correctly decode the BA Bitmap, the Recipient indicates this value using two bits of the Fragment Number field 622 in the BlockAck frame. In case the two bits are used jointly, the following four cases can be signaled: 00 (unfragmented); 01 (two fragments); 10 (three fragments); and 11 (four fragments). Aside from the unfragmented case, the remaining three values also indicate the use of Level 3 fragmentation. Alternatively, one bit is used to indicate the use of Level 3 fragmentation (0: Level 3 fragmentation is not used; 1: Level 3 fragmentation is used) while the second bit is used to indicate the maximum number of fragments present in the received A-MPDU. For example: 0 to indicate two fragments and 1 to indicate four fragments.

Referring to FIGS. 10A, 10B and 10C, an example frame exchange sequence 1000 that makes use of the efficient Block Ack mechanism as per the second embodiment is illustrated. Since the first A-MPDU contains MSDUs with 4 fragments, the construction of the BA Bitmap at the recipient, as well as the decoding of the BA Bitmap at the Originator is exactly the same as the construction and decoding of the BA Bitmap 930 in the frame exchange 900. The only difference is that the maximum number of fragments present in the received A-MPDU, equal to 4, is indicated using two bits of the Fragment Number field 622 in the Block Ack frame 938.

Subsequently the Originator transmits the A-MPDU 1010 which is exactly the same as the A-MPDU 940 in the frame exchange 900. In this transmission, the Recipient fails to receive four MPDUs: MPDU 1012 which is the first fragment of the MSDU with SN=7 and MPDUs 1014, 1016 and 1018 carrying the three fragments of MSDU with SN=32. Since all three fragments of the MSDU with SN=32 are not received, the maximum number of fragments received is two. As such, the Recipient records the FST entry 1020 corresponding to the MSDU with SN=32 as 2. Consequently when the BA Bitmap 1030 is constructed, two consecutive zeros 1032 represent the MSDU with SN=32. The Recipient then proceeds to acknowledge the receipt of the A-MPDU 1010 by transmitting a BlockAck frame 1040 carrying the BA Bitmap 950.

Upon receiving the BlockAck frame 1040, the Originator proceeds to decode the BA Bitmap 1030 in a manner similar to that explained earlier in the first embodiment, except that the number of consecutive zeros that represent MSDUs that are completely not received, in this case 2, is indicated in the Fragment Number field 622 of the BlockAck frame 1040. When the Originator comes across the two consecutive bits 1032 corresponding to the MSDU with SN=32, it is able to correctly decode that all three MPDUs corresponding to the MSDU with SN=32 were not received by the Recipient.

Third Embodiment

In the first and second embodiment, it was assumed that the maximum number of fragments allowed per MSDU is fixed at 4. However, instead of fixing the maximum number of fragments allowed per MSDU to a fixed value, the Originator and the Recipient may be allowed to negotiate this value during the setup phase of the HT-immediate Block Ack mechanism between the two devices. Bigger values may be used when the MSDUs that are to be communicated are comparatively bigger, while smaller values may be negotiated if the MSDUs are smaller. The maximum number of fragments allowed per MSDU may also depend on the resources available at either of the devices as bigger values would require the device to possess bigger buffer etc. The maximum number of fragments allowed per MSDU may be carried in the ADDBA Extension element 1100 as shown in FIG. 11A.

The Element ID 1102 is set as specified by the 802.11 specification; the Length field 1104 indicates one octet, while the ADDBA Capabilities field 1106 is customized as illustrated in FIG. 11B. Aside from the existing No-Fragmentation subfield 1112, the remaining seven bits are currently reserved. As per the third embodiment, some of the reserved bits, e.g. two bits are used to indicate the Maximum Fragments per MSDU 1124 while the remaining five bits are reserved. The encoding of the Maximum Fragments per MSDU 1124 may be as shown in Table 1130 in FIG. 11C whereby values 0, 1, 2 and 3 represent a maximum of 2, 4, 8 and 16 fragments per MSDU respectively. If four bits are used to encode the Maximum Fragments per MSDU, even finer levels can be indicated.

In order to support higher number of fragments per MSDU, the Scoreboard as well as the Fragment Size Table would need to be changed as well. While two bits per FST entry would be enough to record the number of fragment when the Maximum Fragments per MSDU is 4 or less, four bits per FST entry would be required when the Maximum Fragments per MSDU is 16. Additionally, 16 bits per MSDU are required in the Scoreboard Bitmap to record the receive status of the MPDUs.

The third embodiment introduces a novel encoding method for the Scoreboard Bitmap that, by adding one extra bit per MSDU, allows the scoreboard bitmap to jointly record both the receive status as well as the number of fragments per MSDU. This is illustrated in FIG. 11D, for the example when the Maximum Fragments per MSDU is negotiated to be 4. A number of bits equal to the Maximum Fragments per MSDU plus one, 5 in this case, are allocated in the Scoreboard Bitmap 1140 per MSDU. The bit numbering for each bit group is illustrated in 1150, with B0, B1, B2, B3 and B4 representing the first, second, third, fourth and fifth bit of the bit group 1150.

FIG. 11E illustrates Table 1160 of the encoding of each bit group of the Scoreboard Bitmap 1140. When the Maximum Fragments per MSDU is negotiated as 4, there are four possible encodings. When B4=0, there are two possibilities: either the entire MSDU is not received, in which case the rest of the bits B0, B1, B2 and B3 are all set to 0, or the number of fragments per MSDU is equal to 4 and the bits B0, B1, B2 and B3 indicate the receive status of fragments 0, 1, 2 and 3 respectively. This encoding is represented by the bit group 1142. When B4=1 and B3=0, the number of fragments per MSDU is equal to 3 and the bits B0, B1 and B2 indicate the receive status of fragments 0, 1 and 2 respectively. This encoding is represented by the bit group 1144. Similarly, when B4=1, B3=1 and B2=0, the number of fragments per MSDU is equal to 2 and the bits B0 and B1 indicate the receive status of fragments 0 and 1 respectively. This encoding is represented by the bit group 1144. Lastly, when B4=1, B3=1, B2=1 and B1=0, the number of fragments per MSDU is equal to 1 i.e. the MSDU is unfragmented and bit B0 indicates the receive status of the MSDU. This encoding is represented by the bit group 1148. The shaded boxes in 1140 represent the bits that are used to record the receive status of the MPDUs and will be copied over to the BA Bitmap. In general, the position of the last bit that is set to 0 in a bit group indicates the encoding of the bit group. If "n" represents the maximum number of fragments allowed per MSDU as negotiated during the HT-immediate Block Ack Setup, a bit group of n+1 bits is required per MSDU in the Scoreboard Bitmap. If B0 represents the first bit in the bit group and Bn represents the bit at position n+1, then the Scoreboard Bitmap encoding can be generalizes as follows:

If Bn=0 and if the rest of the bits in the bit group are zero as well, the entire MSDU is not received, else the number of fragments=n and B0 to Bn-1 indicate the receive status of fragments 0 to n-1 respectively.

If Bn to Bm are all 1 and Bm−1=0, then the number of fragments=m−1 and B0 to Bm−2 indicate the receive status of fragments 0 to m−2 respectively. (m<=n; m>2)

If Bn to Bn−2 are all 1 and B1=0, then the MSDU is unfragmented and B0 indicates the receive status of the MSDU.

The scoreboard bitmap operation is briefly explained next. All bits of the scoreboard bitmaps are initialized to 0. When a fragment or MSDU is received, based on the value of the Number of Fragments field 602, the corresponding bits are set to the values as described in the Table 1160 for example if the value of the Number of Fragments field 602 is 3, B4 is set to 1 and B3 is set to 0; if the value of the Number of Fragments field 602 is 1, B4, B3 and B2 are set to 1 and B1 set to 0. In addition the bit corresponding to the Fragment Number field 604 is set to 1; B0 for fragment 0, B1 for fragment 1, B2 for fragment 2 and B3 for fragment 4.

Alternatively, if the Number of Fragments is not explicitly indicated in MPDUs, the recipient uses the More Fragments bit in the Frame Control field and the Fragment Number field in the Sequence Control field of the MPDUs to determine the number of fragments. In this case, the Recipient is able to determine the number of fragments only when the last fragment is received (as indicated by the More Fragments bit set to 0). As such the scoreboard bitmap encoding may need to be updated dynamically based on the fragments received. For example when the first fragment is received, if the More Fragments bit is set to 1, the recipient knows that more fragments exist but it does not know the exact number of fragments and so it sets B4 to 0 and B0 to 1. Subsequently, when the second fragment of the same MSDU is received and if the More Fragments bit is set to 0, the recipient now knows that the Number of Fragments is 2 and hence it sets B4, B3 and B2 to 1, 1 and 0 respectively to indicate two fragments and sets B1 to 1 to indicate that fragment 2 has been received.

However, in order to avoid corrupting the Scoreboard Bitmap encoding, in case of fragmented MSDUs, one additional rule is required: if a bit group has already been encoded to a value other than all zeros, the encoding may only be changed either to all zeros (when the last fragment of an MSDU is not received) or to indicate a larger number of fragments. In order words, the last zero in a bit group may only be shifted to a higher bit but not to a lower bit. This rule is required to prevent the reception of MPDUs carrying retransmitted fragments corrupting the bit group encoding.

To copy the receive status to the BA Bitmap, the recipient starts from the last bit of each bit group of the Scoreboard Bitmap. If the bit is set to 1, it moves to the next bit and if the bit is 0, it copies the content of the remaining bits in the bit group to the corresponding bits in the BA Bitmap. For example, for the bit group 1142, since B4=0, the four shaded bits are copied over to the BA Bitmap; for bit group 1144, since B4=1, B3 is checked and since B3=0, the remaining 3 shaded bits are copied over to the BA Bitmap; for bit group 1146, since B4 and B3 are set to 1 and B2=0, B1 and B0 are copied over to the BA Bitmap; for bit group 1148, since B4, B3 and B2 are set to 1 and B1=0, B0 is copied over to the BA Bitmap. Since both the number of fragments as well as the receive status is recorded in the Scoreboard Bitmap itself, not only the memory required for FST is saved, but the process of constructing the BA Bitmap may be faster as well since there is no need to refer to a separate FST table to decide the number of bits to be copied from the Scoreboard Bitmap.

FIG. 12A illustrates an ADDBA Request/Response exchange 1200 used to negotiate an HT-immediate Block Ack agreement involving a Level 3 fragmentation between two wireless devices prior to any actual frame exchanges involving Level 3 fragmentation. The Originator, in the ADDBA Request frame 1202, requests for the maximum number of fragments allowed per MSDU to be 16 by setting the Maximum Fragments per MSDU field. Due to resource constraints, the Recipient is only able to support up to six fragments per MSDU as indicated in the Maximum Fragments per MSDU field in the ADDBA Response frame 1204.

FIGS. 12B, 12C and 12D illustrate an example frame exchange sequence 1210 that makes use of the efficient Block Ack mechanism as per the third embodiment. In this example, the value of WinSizeO, WinSizeR and BitmapLen is equal to 64. The Originator may maintain a Fragment Size Table (FST) 1212 to keep track of the number of fragments present in the MSDUs being transmitted in the current transmission window although this is optional, since the Originator can easily obtain information regarding the number of fragments in each MSDU by referring to its Transmit Buffer. The Originator initiates the frame exchange by transmitting A-MPDU 1213 that aggregates twenty seven MPDUs, starting with six MPDUs carrying the six respective fragments of MSDU with SN=1, one MPDU carrying unfragmented MSDUs with SN=2, three MPDUs carrying the three respective fragments of MSDU with SN=3 and seventeen MPDUs carrying unfragmented MSDUs with SN 4 to 20. All the relevant entries of FST 1212 are also updated accordingly.

In this transmission, the Recipient fails to receive six MPDUs: MPDUs 1214, 1215, 1216, 1217 and 1218 carrying the first five fragments of MSDU with SN=1 and MPDU 1219 carrying the last fragment of the MSDU with SN=3. In this example, SN=1. As per the third embodiment, the Number of Fragments is not explicitly indicated in the MPDUs by the Originator and hence the recipient need to use the More Fragments bit in the Frame Control field and the Fragment Number field in the Sequence Control field of the MPDUs to determine the number of fragments present in a MSDU. If the More Fragments bit is set to 0 and the Fragment Number field is also zero in an MPDU, it indicates that the MPDU carries an unfragmented MSDU. If the More Fragments bit is set to 1, it indicates that the MPDU carries a fragmented MSDU and more fragments of the MSDU exist. If the More Fragments bit is set to 0 and the Fragment Number field is not zero in an MPDU, it indicates that the MPDU carries the last fragment of the MSDU. However, one drawback of this is that the Recipient needs to receive the last fragment of an MSDU to determine the number of fragments present in an MSDU with absolute certainty.

Every time a new HT-immediate Block Ack involving a Level 3 fragmentation is setup, the Recipient creates a Scoreboard Bitmap 1230 to record the receive status of each MPDU. Since the maximum number of fragments allowed per MSDU is negotiated as six, a bit group of seven bits each is required in the Scoreboard Bitmap for one MSDU and all bits are initialized to 0 at the time of creation. Upon receiving the A-MPDU 1213, the Recipient starts to record the receive status of each individual MPDU in the A-MPDU. Even though the first five fragments of the MSDU with SN=1 are lost, since the last fragment is received correctly, the Recipient is able to correctly determine the number of fragments as six and it proceeds to encode the first bit group 1231 to indicate number of fragments=6 and also sets the sixth bit corresponding to the sixth fragment to 1.

Upon receiving the MPDU carrying the unfragmented MSDU with SN=2, the Recipient likewise encodes the second bit group 1233 to indicate number of fragments=1 and also sets the first bit to 1. The scenario for the MSDU with SN=3 is a bit different; even though the first two fragments are received, since the third and the last fragment 1219 is not received, the Recipient is unable to determine the number of fragments present in the MSDU and hence it sets the third bit group 1235 to all zeros. The bit groups corresponding to the MSDUs with SN 4 to 20 are also encoded in a similar fashion. Once the end of the A-MPDU 1213 is reached, starting from the first bit group 1231, the Recipient starts to create the BA Bitmap 1240 as explained earlier. Since the last bit 1232 of the bit group 1231 is set to 0, the first six bits of the bit group 1231 are copied over to the first six bits of the BA Bitmap 1240.

Next, based on the position of the last bit 1234 set to 0 in the bit group 1233, the first bit is copied over to the next bit in the BA Bitmap. Similarly, since the last bit 1236 of the bit group 1235 is set to 0, the first six bits of the bit group 1235, which happen to be all zeros, are copied over to the next six bits of the BA Bitmap as indicated by 1242. The rest of the BA Bitmap is created in a similar manner and transmitted to the Originator in the BlockAck frame 1248. The decoding of the BA Bitmap 1240 at the Originator side is the same as described in the first embodiment. Upon receiving six continuous zeros 1242 at the Sequence Number boundary of the MSDU with SN=3, the Originator decodes this as all three fragments of the MSDU with SN=3 failing to be received by the Recipient and re-transmits them in the next A-MPDU 1250. Although this creates some inefficiency as the Originator needs to retransmit fragments one and two even though they were received by the Recipient, this rule is necessary to ensure that the Originator is able to decode the rest of the BA Bitmap correctly.

Based on the contents of the BlockAck 1248, the Originator transmits the next A-MPDU 1250 that aggregates the five failed MPDUs corresponding to the MSDUs with SN=1, the three failed MPDUs corresponding to MSDUs with SN=3 as well ten new MPDUs carrying unfragmented MSDUs with SN 21 to 30. In this transmission, the Recipient fails to receive two MPDUs 1252 and 1254 carrying the first two fragments of the MSDU with SN=3. However, since the last fragment of the MSDU with SN=3 is received, the Recipient is now able to correctly determine the number of fragments in the MSDU with SN=3. The received MPDUs are recorded in the Scoreboard Bitmap 1260 as per the encoding scheme explained earlier. The first bit group 1262 and the third bit group 1264 are both updated to reflect the reception of the respective fragments. The BA Bitmap 1270 is created based on the content of the Scoreboard Bitmap and transmitted to the Originator in the BlockAck frame 1280. The 3 bits 1272 allocated for the MSDU with SN=3 now correctly reflects the number of fragments in the MSDU. By referencing the FST, the Originator is able to correctly decode the received BA Bitmap.

Fourth Embodiment

Even though it is possible to indicate the number of fragments per MSDU using two bits of the Fragment Number field within the Sequence Control field in the MAC header as shown in FIG. 6A, this limits the number of fragments that per MSDU to four. As per the fourth embodiment the number of fragments is indicated using one of the control subfields within the Aggregated Control (A-Control) subfield of the HE Variant HT Control field.

FIG. 13A illustrates the format of the A-Control subfield of the HE Variant HT Control field 1300 as defined in IEEE 802.11ax. The A-Control subfield contains a sequence of one or more Control subfields 1310, . . . , 1320, followed by an optional Padding subfield 1330 which is set to a sequence of zeros so as to make the length of the A-Control subfield equal to 30 bits. Each Control subfield is made up of a fixed length Control ID subfield and a variable length Control Information subfield. The Control ID subfield indicates the type of information carried in the Control Information subfield, while the length of the Control Information subfield is fixed for each value of the Control ID subfield that is not reserved.

FIG. 13B illustrates the format of the Control subfield 1350 used to indicate the number of fragments as per the fourth embodiment. Aside from the Control ID subfield 1352, it carries the four-bit long Number of Fragments subfield 1354. As per the fourth embodiment, each MPDU carrying a fragmented MSDU includes the Control subfield 1350 in the MAC header with the Number of Fragments field 1354 set to the number of fragments of the MSDU that are transmitted in the same A-MPDU. All the fragments of an MSDU transmitted in the same A-MPDU carry the same value in the Number of Fragments field 1354. This allows the Recipient to correctly allocate the correct number of bits to a MSDU in the BA Bitmap even if just a single fragment is received.

Fifth Embodiment

The fifth embodiment introduces yet another encoding for the BA Bitmap. The bits of the BA Bitmap are grouped into two types:

1) Type 1 block used to indicate the receive status of the fragments of a fragmented MSDU when at least one fragment is received and at least one fragment is not received. The size of the Type 1 block depends on the maximum number of fragments of an MSDU allowed to be transmitted in an A-MDPU (X). Type 1 block is X+1 bits in length.

2) Type 2 block used to indicate the receive status of either an unfragmented MSDU, or a fragmented MSDU when none or all the fragments are received. Type 2 block is always 2 bits in length.

The fifth embodiment assumes that the maximum number of fragments allowed to be transmitted in an A-MDPU is fixed at 4. FIG. 14A illustrates the general structure of a BA Bitmap block 1400. The Least Significant Bit (LSB) 1410, known as the Block Type, indicates the type of the block while the variable size Ack bits field 1420 indicates the receive status of frames.

FIG. 14B illustrates the structure of a Type 1 block 1430. In a Type 1 block, the Block Type 1440 is set to 1 while the four remaining bits of the Ack Bits field 1450 of a Type 1 block are used to indicate the receive status of individual fragments. FIG. 14C illustrates the structure of a Type 2 block 1460. In a Type 2 block, the Block Type 1470 is set to 0 and the second bit 1480 indicates the receive status of the entire MSDU. The second bit 1480 is set to 0 if an unfragmented MSDU is not received or even a single fragment of a fragmented MSDU is not received. The second bit 1480 is set to 1 if an unfragmented MSDU is received or all the fragments of a fragmented MSDU are received.

With regards to the Scoreboard Bitmap and the Fragment Size Table, any of the methods introduced in the earlier embodiments may be used to record the receive status of frames or to record the number of fragments per MSDU.

When the end of the A-MPDU is reached and the Recipient creates the BA Bitmap, some sort of conversion is required to encode the Scoreboard Bitmap to either Type 1 or Type 2 blocks. Based on the bits that are set in the Scoreboard Bitmap and the knowledge of the number of fragments, the Recipient chooses the appropriate type of block to be used for each MSDU as per the rule explained earlier.

However, the fifth embodiment introduces a new encoding for the Scoreboard bitmap that is specially catered for the BA Bitmap encoding introduced in the fifth embodiment. This is illustrated in FIG. 15A, for the example when the Maximum Fragments per MSDU is fixed at 4. A number of bits equal to the Maximum Fragments per MSDU plus one, 5 in this case, are allocated in the Scoreboard Bitmap 1500 per MSDU. The same encoding defined for the BA Bitmap is also used for the Scoreboard bitmap. Initially all the bits in the Scoreboard bitmap are set to 0, which means that the first two bits of each 5-bit block per MSDU can be interpreted as being a Type 2 block indicating an MSDU that is not received.

If an unfragmented MSDU is received, the second bit 1480 of the corresponding block is set to 1. The remaining 3 bits in the block remains unused. 1506 and 1508 are examples of such Type 2 blocks. If a fragmented MSDU is received, and the corresponding bitmap block indicates a Type 2 block, the Block type bit of the corresponding block is set to 1 to indicate a Type 1 block, and the bit in the Ack Bit field 1450 corresponding to the fragment is also set to 1. Subsequently, when the last fragment of the MSDU is received and all other fragments of the MSDU have also been received, the block is converted to a Type 2 block by setting the Block Type bit to 0. In this case since the second bit is already set to 1 (to indicate that the first fragment has been received), the bitmap block correctly reflects that all fragments of the MSDU have been received. The conversion from a Type 1 block to a Type 2 block is possible only when it is determined that all the fragments of the corresponding MSDU have been received. If the Recipient is unable to determine whether all the fragments have been received or not, then the Type 1 block is left as it is.

When the Recipient creates the BA Bitmap 1510, either upon reaching the end of the A-MPDU (implicit Block Ack request) or upon receiving a BlockAckReq frame (explicit Block Ack request), it simply copies the relevant bits from the Scoreboard Bitmap to the corresponding position in the BA Bitmap. In the case of Type 1 block, all five bits are copied over to the BA Bitmap (e.g. 1512, 1514), whereas in the case of Type 2 block, only the first two bits are copied over (e.g. 1516, 1518). In the event that upon nearing the end of the BA Bitmap, it is discovered that there are not enough bits left in the BA Bitmap to copy over the next block in the Scoreboard bitmap in its entirety, the remaining bits in the BA Bitmap are all set to 0. As an example, if the next block to be copied in the ScoreBoard bitmap is a Type 1 block, and only two bits are left at the end of the BA Bitmap, the two bits are both set to 0 (e.g. 1519).

When the Originator receives the BlockAck frame that contain the BA Bitmap 1510 which is encoded as per the fifth encoding, starting from the first bit 1511, it determines whether the first block 1512 is a Type 1 or a Type 2 block. Since the Block Type bit 1511 is set to 1, 1512 is determined to be a Type 1 block and the next four bits indicate the receive status of the fragments. Similarly, the next bit 1513 indicates that the next block 1514 is a Type 1 block as well. Moving forward five bits, the bit 1515 indicates that the block 1516 is a Type 2 block and hence the next bit indicates the receive status of the entire MSDU. Since 1516 is a Type 2 block, the next bit 1517 determines the block type of the next block 1518 which is also determined to be a Type 2 block.

Figure 16C:
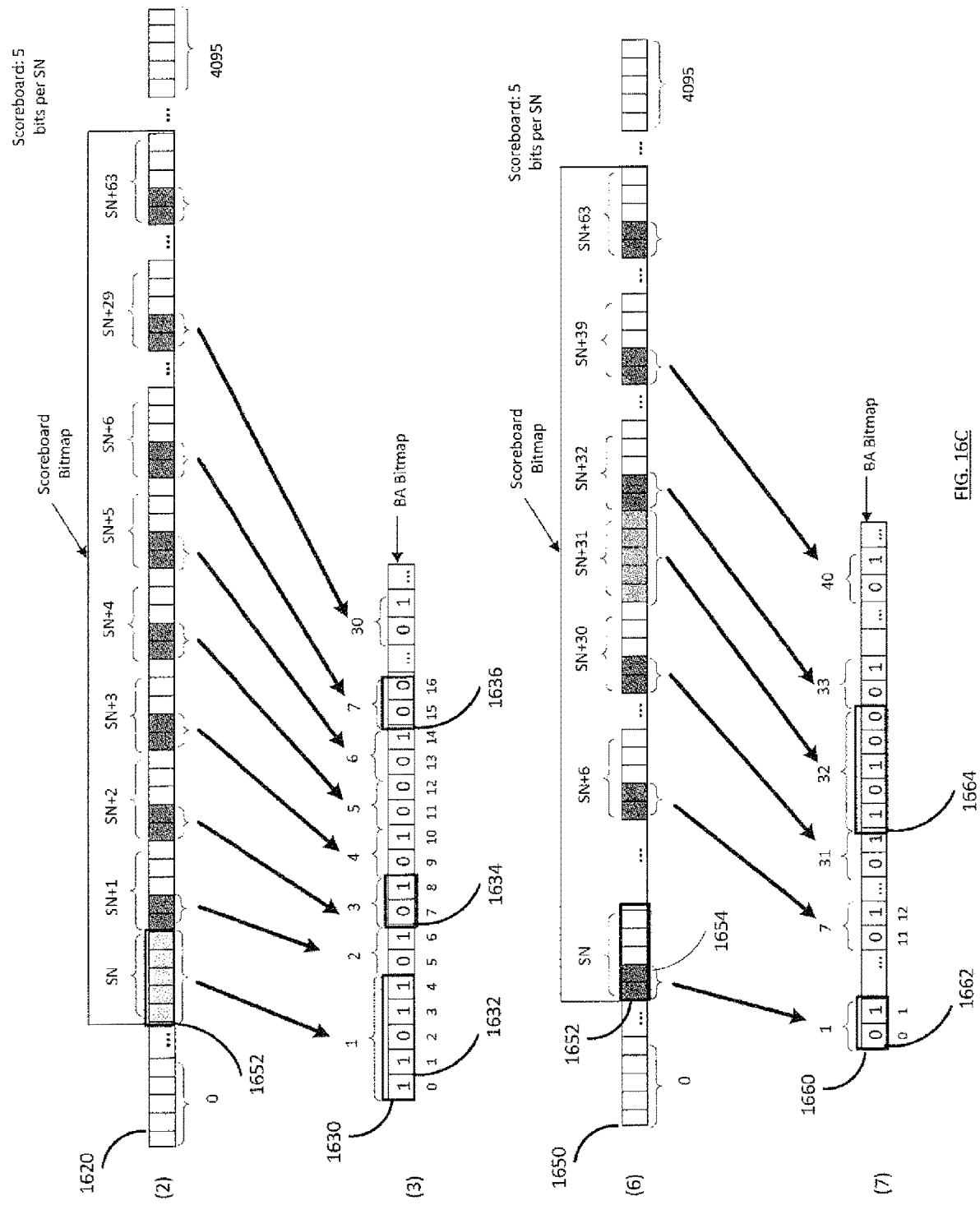
FIG. 16C is a right-hand portion of a diagram of an example frame exchange sequence that highlights the Block Acknowledgement mechanism as per the fifth embodiment.

FIGS. 16A, 16B and 16C illustrate an example frame exchange sequence 1600 that makes use of the efficient Block Ack mechanism as per the fifth embodiment. In this example, the value of WinSizeO, WinSizeR and BitmapLen is equal to 64. The Originator initiates the frame exchange by transmitting A-MPDU 1610 that aggregates thirty four MPDUs, starting with four MPDUs carrying the four respective fragments of MSDU with SN=1, five MPDUs carrying unfragmented MSDUs with SN 2 to 6, two MPDUs carrying the two respective fragments of MSDU with SN=7 and twenty three MPDUs carrying unfragmented MSDUs with SN 8 to 30.

In this transmission, the Recipient fails to receive four MPDUs: MPDU 1611 carrying the second fragment of MSDU with SN=1, MPDU 1612 carrying the unfragmented MSDU with SN=5 and MPDUs 1614 and 1616 carrying the two fragments of the MSDU with SN=7. In this example, SN=1.

Upon receiving the A-MPDU 1610, the Recipient starts to record the receive status of each individual MPDU of the A-MPDU in the Scoreboard bitmap as explained earlier. The three received fragments of the MSDU with SN=1 is recoded in the Scoreboard bitmap as a Type 1 block with the first, third and fourth bit in the Ack Bits field 1450 set to 1. Similarly the receive status of the unfragmented MSDUs with SN=2 to 4 and SN=6 are recorded as Type 2 blocks with the respective Ack bits 1480 set to 1. As for the MSDU with SN=5 as well as both MPDUs of the MSDU with SN=7, the corresponding Scoreboard blocks are recorded as Type 2 blocks with the respective Ack bits 1480 set to 0. The rest of the MSDUs are recorded in the Scoreboard bitmap in a similar manner. Upon reaching the end of the A-MPDU 1610, the relevant content of the Scoreboard 1620 is copied over to the BA Bitmap 1630, one block at a time. A Type 1 block, e.g. 1632, takes up five bits in the BA Bitmap while a Type 2 block, e.g. 1634 or 1636, takes up two bits. Once the BA Bitmap is created, it is transmitted to the Originator in the BlockAck frame 1638.

Once the Originator receives the BlockAck frame 1638, it decodes the BA Bitmap 1630 as explained earlier. Starting from the first bit of the BA Bitmap, it first determines the block type before referring to the Ack bits to determine the receive status of the MPDUs. Based on the contents of the BA Bitmap 1630, the Originator transmits the next A-MPDU 1640 that aggregates the two failed MPDUs corresponding to the MSDUs with SN=1 and SN=5, the two failed MPDUs corresponding to MSDUs with SN=7, one MPDU carrying the unfragmented MSDU with SN=31, three MPDUs carrying the three respective fragments of the MSDU with SN=32, as well as eight MPDUs carrying unfragmented MSDUs with SN 33 to 40. In this transmission, the Recipient fails to receive two MPDUs 1644 and 1646 carrying the first and the third fragments of the MSDU with SN=32.

Upon receiving the A-MPDU 1640, the Recipient updates the Scoreboard bitmap 1650 as explained earlier, for example encoding MSDU with SN=32 as Type 1 block while encoding all the unfragmented MSDUs as Type 2 blocks. Of special interest is the block 1652 corresponding to MSDU with SN=1. Earlier it was encoded as a Type 1 block, but since the missing second fragment is received in the A-MPDU 1640, all the four bits of the Ack bits field 1450 are now 1 and hence, the block is re-encoded as a Type 2 block with the Ack bit 1654 set to 1 to indicate that all the fragments have been received. Upon reaching the end of the A-MPDU 1640, the relevant content of the Scoreboard 1650 is copied over to the BA Bitmap 1660, one block at a time and transmitted to the Originator in the BlockAck frame 1668.

Upon receiving the BlockAck frame 1668, the Originator proceeds to decode the BA Bitmap 1660. The Type 2 blocks 1662 and 1664 are decoded as indicating that all the fragments of the MSDU with SN=1 and SN=7 have been received. Similarly the Type 1 block 1666 is decoded as indicating that only the second fragment of the MSDU with SN=32 has been received and so on.

<Radio Communication System>

FIG. 17 illustrates an example method 1700 to be implemented by a wireless device, which is an Originator of a block ack agreement that supports a Level 3 fragmentation, in order to realize the efficient block ack mechanism explained in the present disclosure. Some of the steps are optional and only implemented if the corresponding feature is supported by the device. At 1710, if applicable, at the time of setting up a block ack agreement that supports a Level 3 fragmentation, along with other parameters block ack agreement, the Originator also negotiates the maximum number of fragments of an MSDU that are allowed to be transmitted in the same A-MPDU. At 1720, if the Originator maintains a Fragment Size Table (FST), for each MPDU carrying a fragmented MSDU, it also records the total number of fragments of the MSDU in the corresponding entry of the FST. At 1730, if applicable, the Originator also indicates the total number of fragments of the MSDU in the designated field in the MAC header of the MPDU (for example, in the Number of Fragments field in the Sequence Control field, or in a A-Control subfield of the HE Variant HT Control field etc.). Subsequently, at 1740, upon receiving the BlockAck frame sent in response to the A-MPDU carrying MPDUs with Level 3 fragmentation, the Originator decodes the BA Bitmap contained the BlockAck frame as per the implemented Bitmap encoding scheme.

FIG. 18 illustrates an example method 1800 to be implemented by a wireless device, which is a Recipient of a block ack agreement that supports a Level 3 fragmentation, in order to realize the efficient block ack mechanism explained in the present disclosure. Some of the steps are optional and only implemented if the corresponding feature is supported by the device. At 1810, if applicable, at the time of setting up a block ack agreement that supports a Level 3 fragmentation, along with other parameters block ack agreement, the Recipient also negotiates the maximum number of fragments of an MSDU that are allowed to be transmitted in the same A-MPDU. The Recipient also initializes the Scoreboard bitmap, the Fragment Size Table (FST) if present, as well as other variables related to the block ack agreement.

At 1820, upon receiving an A-MPDU carrying MPDUs with Level 3 fragmentation, for each MPDU carrying a fragmented MSDU, in a corresponding entry of the FST, the Recipient records the number of fragments corresponding to the MSDU. This information may be based on a relevant field in the MAC header (for example the Number of Fragments field in the Sequence Control field, or in a A-Control subfield of the HE Variant HT Control field etc.), or it may also be based on the Recipient's observation of the More Fragment bit in the Frame Control field of the Mac header. At 1830, the Recipient records the receive status of each MPDU in the corresponding bit in the Scoreboard bitmap according to the implement encoding scheme. At 1840, the Recipient constructs the BlockAck frame that includes the BA Bitmap field encoded according to the relevant portion of the Scoreboard bitmap as per the implemented encoding scheme. Finally at 1850, the Recipient transmits the BlockAck frame.

<Configuration of an Originator>

FIG. 19A is a block diagram of an example wireless device 1900 that acts as an Originator. The Originator may be any one of the STAs or the AP in FIG. 1. The wireless device 1900 comprises transmitter 1901, frame generator 1903, decoder 1907 and receiver 1909. The frame generator 1903 generates A-MPDUs from upper layer MSDUs or MMPDUs. The A-MPDUs may also contain fragmented MSDUs or MMPDUs. The transmitter 1901 transmits the generated A-MPDUs to one or more Recipients. The receiver 1909 receives BlockAck frames from each of Recipients. The BlockAck frame includes a bitmap field. And the decoder 1907 decodes the bitmap field in the BlockAck frame and passes the decoded information to the frame generator 1903. Based on the decoded bitmap information from the decoder 1907, the frame generator 1903 deletes the successfully transmitted MPDUs from the transmit queue while the MPDUs whose transmission were unsuccessful are re-transmitted from the transmitter 1901.

FIG. 19B is a detailed block diagram of an example wireless device 1900 that acts as an Originator, which may be any one of the STAs or the AP in FIG. 1. The wireless device 1900 comprises a Central Processing Unit (CPU) 1930 coupled to a memory 1920, a secondary storage 1940 and to one or more wireless communication interfaces 1950. The secondary storage 1940 may be a non-volatile computer readable storage medium that is used to permanently store pertinent instruction codes, data etc. At the time of start up, the CPU 1930 may copy the instruction codes as well as related data to the volatile memory 1920 for execution. The instruction code may be an operating system, user applications, device drivers, execution codes etc. which are required for the operation of the wireless device 1900. The wireless device 1900 may also comprise a power source 1910 for example a lithium ion battery or a coin cell battery etc. or it may also be Mains electricity.

The wireless communication interface 1950 may comprise an interface for cellular communication, or an interface for short range communication protocols such as Zigbee, or it may be a WLAN interface. The Wireless interface 1950 may further comprise a MAC module 1952 and a PHY module 1960. Among other sub-modules, the MAC module 1952 may comprise a Transmission module 1954 that is responsible for various MAC level functions required for transmission of frames. The MAC module 1952 may further comprise a Transmit Buffer 1956 that is used to store the data frames received from the upper layers as well as frames generated within the MAC layer, until the frames are either successfully transmitted or until the frame reach their lifetime, upon which they are deleted. The PHY module is responsible for the conversion of the MAC module data to/from the transmission/reception signals. The wireless interface may also be coupled, via the PHY module, to one or more antennas 1970 that are responsible for the actual transmission/reception of the wireless communication signals on/from the wireless medium.

FIG. 20 illustrates the Transmission module 1954 in FIG. 19B in more detail. Among other sub-modules, the Transmission module 1954 may comprise a Sequence Number Generator 2000 that assigns unique sequence numbers to the MSDUs received from the upper layer as well as to the MMPDUs generated within the MAC layer. The Transmission module 1954 may also comprise a Fragmentation module 2010 that is responsible for deciding whether a MSDU or MMPDU needs to be fragmented and if so, also decides the number of fragments as well as the size of the fragments. The Fragmentation module 2010 also assigns fragment numbers to the fragments. If applicable, the Fragmentation module 2010 also updates the Number of Fragments field 602 of each MPDU that carries a fragment.

The Transmission module 1954 may also maintain one or more Fragment Size Table(s) 2030 to keep track of the number of fragments in the transmitted MSDUs. The Transmission module 1954 may further comprise a Frame Aggregation module 2020 that aggregates the MSDUs and fragments into A-MPDUs. When it is time, the MAC layer passes the A-MPDUs to the PHY layer for transmission. The Transmission module 1954 may also comprise a BA Bitmap decoder module 2040 that is responsible for decoding the BA Bitmaps of the received Block Ack frames according to the implemented decoding scheme. If the BA Bitmap indicates that all the fragments of a MSDU or MMPDU have been received by the Recipient, the MSDU or MMPDU is deleted from the transmit buffer 1956. Otherwise, the unreceived fragments need to be retransmitted.

In a particular embodiment, the operating system comprises a Real Time Operating System (RTOS), the user application comprise a web browser or a smartphone app, device drivers comprises a WLAN driver and the execution code may comprise code which when executed by the CPU 1930, causes the method 1700 to be executed. The Fragment Size Table 2030 is used in 1720 to keep a record of the number of fragments. The BA Bitmap decoder 2040 is used in 1740 as a decoder to decode the received BA Bitmap.

The Originator 1900 may comprise many other components that are not illustrated, for sake of clarity, in FIG. 19B and FIG. 20. Only those components that are most pertinent to the present disclosure are illustrated.

<Configuration of a Recipient>

FIG. 21A is a block diagram of an example wireless device 2100 that acts as an Recipient. The Recipient may be any one of the STAs or the AP in FIG. 1. The wireless device 2100 comprises a receiver 2109, a memory 2107, an acknowledgement generator 2103 and a transmitter 2101. The receiver 2109 receives a plurality of frames from an Originator. And a payload of each frame may consist of either fragmented packet(s) or unfragmented packet(s) or a combination thereof. The memory 2107 record receive status of each of the plurality of frames. The acknowledgement generator 2103 generates a block acknowledgment (BlockAck) frame that contains at least one bitmap field used to indicate the receive status of the frames. The number of bits allocated in the bitmap field for a packet may be variable. The transmitter 2101 transmits the BlockAck frame when instructed by the acknowledgement generator 2103.

FIG. 21B is a detailed block diagram of an example wireless device 2100 that acts as an Recipient, which may be any one of the STAs or the AP in FIG. 1. The wireless device 2100 comprises a Central Processing Unit (CPU) 2130 coupled to a memory 2120, a secondary storage 2140 and to one or more wireless communication interfaces 2150. The secondary storage 2140 may be a non-volatile computer readable storage medium that is used to permanently store pertinent instruction codes, data etc. At the time of start up, the CPU 2130 may copy the instruction codes as well as related data to the volatile memory 2120 for execution. The instruction code may be an operating system, user applications, device drivers, execution codes etc. which are required for the operation of the wireless device 2100. The wireless device 2100 may also comprise a power source 2110 for example a lithium ion battery or a coin cell battery etc. or it may also be Mains electricity.

The wireless communication interface 2150 may comprise an interface for cellular communication, or an interface for short range communication protocols such as Zigbee, or it may be a WLAN interface. The Wireless interface 2150 may further comprise a MAC module 2152 and a PHY module 2160. Among other sub-modules, the MAC module 2152 may comprise a Reception module 2154 that is responsible for various MAC level functions required for reception of frames. The MAC module 2152 may further comprise a receive buffer 2156 that is used to store the frames received from other wireless devices until they are ready to be processed within the MAC layer or to be passed on the relevant upper layers.

FIG. 22 illustrates the Reception module 2154 in FIG. 21B in more detail. Among other sub-modules, the Reception module 2154 may comprise a Frame Deaggreation module that is responsible for extracting the individual MPDUs from a received A-MPDU. The Reception module 2154 may also comprise a Defragmentation module 2210 that performs the de-fragmentation procedure of recombining the received fragments into the respective MSDU. When all the fragments of an MSDU have been received, the MSDU may be passed on the respective upper layer. However, at times it may happen that due to the reception failure of some of the fragments of an earlier MSDU, an MSDU that was received at a later point in time may be recombined first. If the upper layer protocol requires the received MSDU to be forwarded to it in the correct order, the Reception module 2154 would need to perform a reordering of the received MSDUs. For this purpose the Reception module 2154 may also comprise a Receive Reordering module 2200.

The Reception module 2154 may also comprise one or more memory units 2240 to store the Scoreboard contexts, one per each block ack agreement. Among them, there may be one or more L3 Scoreboard bitmaps that are used to record the reception status of incoming MSDUs when a block ack agreement involving a Level 3 fragmentation has been established with the wireless device 2100 as the Recipient. The Reception module 2154 may also comprise a BA Bitmap encoder module 2250 that is responsible for encoding the reception status of the MSDUs onto the BA Bitmaps according to the implemented encoding scheme. If applicable, the Reception module 2154 may also store one or more Fragment Size Tables 2230 to store the number of fragments in the received MSDUs.

In a particular embodiment, the operating system comprises a Real Time Operating System (RTOS), the user application comprise a web browser or a smartphone app, device drivers comprises a WLAN driver and the execution code may comprise code which when executed by the CPU 2130, causes the method 1800 to be executed. The Fragment Size Table 2230 is used in 1820 to keep a record of the number of fragments. The L3 Scoreboard bitmap within the Scoreboard context 2240 is used in 1830. The BA Bitmap encoder 2250 is used in 1840 as an encoder to encode the BA Bitmap to be transmitted.

The Recipient 2100 may comprise many other components that are not illustrated, for sake of clarity, in FIG. 21B and FIG. 22. Only those components that are most pertinent to the present disclosure are illustrated.

Since a wireless device may have several concurrent block ack agreements where it acts as an Originator in some and a Recipient in others, a wireless device may concurrently implement both the Originator as well as the Recipient modules.

In the foregoing embodiments, the present disclosure is configured with hardware by way of example, but may also be provided by software in cooperation with hardware.

In addition, the functional blocks used in the descriptions of the embodiments are typically implemented as LSI devices, such as integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration. The LSI may include a data input and output coupled thereto.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

INDUSTRIAL APPLICABILITY

This disclosure can be applied to a wireless apparatus for an efficient block ack mechanism.

REFERENCE SIGNS LIST

1900 Originator
1901, 2101 Transmitter
1903 Frame Generator
1907 Decoder
1909, 2109 Receiver
1910, 2110 Power Source
1920, 2107, 2120 Memory
1930, 2130 CPU
1940, 2140 Secondary Storage
1950, 2150 Wireless Interface
1952, 2152 MAC module
1954 Transmission module
1956 Transmit Buffer
1960, 2160 PHY module
1970, 2170 Antenna
2000 Sequence Number Generator
2010 Fragmentation
2020 Frame Aggregation
2030, 2230 Fragment Size Table
2040 BA Bitmap Decoder
2100 Recipient
2103 Acknowledgement Generator
2154 Reception module
2156 Receive Buffer
2200 Receive Reordering
2210 De-fragmentation
2220 Frame De-aggregation
2240 Scoreboard
2250 BA Bitmap Encoder

The invention claimed is:

1. A communication method comprising:
receiving a plurality of frames from a transmitting device, wherein one of the plurality of frames contains one or more fragments of at least one fragmented packet;
recording a receive status of the plurality of frames;
generating a block acknowledgment (BlockAck) frame that contains at least one bitmap field used to indicate the receive status of the plurality of frames, wherein
in a first scheme,
the bitmap field contains a variable number of consecutive bits allocated to the at least one fragmented packet,
the variable number depends on how many fragments the at least one fragmented packet is divided into, and
in response to failing to receive at least one fragment of the one or more fragments of the at least one fragmented packet, setting the variable number to a maximum number of fragments allowed to be transmitted within one transmission window and setting all of the consecutive bits corresponding to the at least one fragmented packet to 0 even if any of the one or more fragments of the at least one fragmented packet is successfully received; and
transmitting the BlockAck frame,
wherein,
the BlockAck frame contains a control field which indicates at least one of an encoding scheme or a decoding scheme for the at least one bitmap field, and
the control field indicates a starting sequence number of the first packet acknowledged in the at least one bitmap field.

2. The communication method of claim 1, wherein the bitmap field contains one bit set to 1 for each received unfragmented packet and one bit set to 1 for each fragment of the at least one fragmented packet that is received.

3. The communication method of claim 1, wherein recording the receive status of the plurality of frames includes:
maintaining the at least one bitmap field large enough to record the receive status of all the at least one fragmented packet allowed to be transmitted within one transmission window; and
maintaining a table large enough to record a number of fragments into which each of the at least one fragmented packet is divided into.

4. The communication method of claim 1, wherein
the allocated bits jointly signal a number of fragments that the at least one fragmented packet is divided into as well as the receive status of the at least one fragmented packet.

5. The communication method of claim 1, wherein,
in a second scheme, the bitmap field includes two types of bit groups,
a first group includes a number of bits equal to one plus the maximum number of fragments allowed to be transmitted within one transmission window, and is used to indicate the receive status of the at least one fragmented packet when at least one of the fragments is received and at least one of the fragments is not received, and
a second group includes two bits, out of which one bit is used to indicate the receive status of the at least one fragmented packet when either all or none of the fragments are received,
wherein one bit of each bit group is used to indicate the type of the bit group.

6. The communication method of claim 1, wherein the BlockAck frame contains at least two sets of bits in the bitmap field, and the at least two sets of bits respectively indicate the receive status of at least two fragmented packets.

7. A communication apparatus comprising:
   a receiver, which in operation, receives a plurality of frames from a transmitting device, wherein one of the plurality of frames contains one or more fragments of at least one fragmented packet;
   a memory, which is coupled to the receiver and which, in operation, records a receive status of the plurality of frames;
   a processor, which is coupled to the memory and which, in operation, generates a block acknowledgment (BlockAck) frame that contains at least one bitmap field used to indicate the receive status of the plurality of frames, wherein
   in a first scheme,
      the bitmap field contains a variable number of consecutive bits allocated to the at least one fragmented packet,
      the variable number depends on how many fragments the at least one fragmented packet is divided into, and
      in response to failing to receive at least one fragment of the one or more fragments of the at least one fragmented packet, setting the variable number to a maximum number of fragments allowed to be transmitted within one transmission window and setting all of the consecutive bits corresponding to the at least one fragmented packet to 0 even if any of the one or more fragments of the at least one fragmented packet is successfully received; and
   a transmitter, which is coupled to the processor and which, in operation, transmits the BlockAck frame,
   wherein
   the BlockAck frame contains a control field which indicates at least one of an encoding scheme or a decoding scheme for the at least one bitmap field, and
   the control field indicates a starting sequence number of the first packet acknowledged in the at least one bitmap field.

8. The communication apparatus of claim 7, wherein the bitmap field contains one bit set to 1 for each received unfragmented packet and one bit set to 1 for each fragment of the at least one fragmented packet that is received.

9. The communication apparatus of claim 7, wherein:
   the at least one bitmap field is large enough to record the receive status of all the at least one fragmented packet allowed to be transmitted within one transmission window; and
   the memory includes a table large enough to record a number of fragments into which each of the at least one fragmented packet is divided into.

10. The communication apparatus of claim 7, wherein the allocated bits jointly signal a number of fragments that the at least one fragmented packet is divided into as well as the receive status of the at least one fragmented packet.

11. The communication apparatus of claim 7, wherein, in a second scheme, the bitmap field includes two types of bit groups,
   a first group includes a number of bits equal to one plus the maximum number of fragments allowed to be transmitted within one transmission window, and is used to indicate the receive status of the at least one fragmented packet when at least one of the fragments is received and at least one of the fragments is not received, and
   a second group includes two bits, out of which one bit is used to indicate the receive status of the at least one fragmented packet when either all or none of the fragments are received,
   wherein one bit of each bit group is used to indicate the type of the bit group.

12. The communication apparatus of claim 7, wherein the BlockAck frame contains at least two sets of bits in the bitmap field, and the at least two sets of bits respectively indicate the receive status of at least two fragmented packets.

* * * * *